US010433163B2

(12) United States Patent
Lee et al.

(10) Patent No.: US 10,433,163 B2
(45) Date of Patent: Oct. 1, 2019

(54) TECHNIQUES FOR DERIVING SECURITY KEYS FOR A CELLULAR NETWORK BASED ON PERFORMANCE OF AN EXTENSIBLE AUTHENTICATION PROTOCOL (EAP) PROCEDURE

(71) Applicant: QUALCOMM Incorporated, San Diego, CA (US)

(72) Inventors: Soo Bum Lee, San Diego, CA (US); Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/489,670

(22) Filed: Apr. 17, 2017

(65) Prior Publication Data

US 2018/0084414 A1 Mar. 22, 2018

Related U.S. Application Data

(60) Provisional application No. 62/396,791, filed on Sep. 19, 2016.

(51) Int. Cl.
*H04W 12/04* (2009.01)
*H04W 12/06* (2009.01)
*H04L 29/06* (2006.01)

(52) U.S. Cl.
CPC .......... *H04W 12/04* (2013.01); *H04W 12/06* (2013.01); *H04L 63/061* (2013.01); *H04L 63/062* (2013.01); *H04L 2463/061* (2013.01)

(58) Field of Classification Search
CPC .................................................. H04W 12/04
See application file for complete search history.

(56) References Cited

U.S. PATENT DOCUMENTS

2003/0236982 A1* 12/2003 Hsu ..................... H04L 63/08
                                                                            713/171
2005/0272466 A1* 12/2005 Haverinen .......... H04L 12/2801
                                                                            455/552.1

(Continued)

FOREIGN PATENT DOCUMENTS

WO    WO-2009087006 A1    7/2009

OTHER PUBLICATIONS

Aboba B., et al., "Extensible Authentication Protocol (EAP)," Request for Comments: 3748, Jun. 1, 2004, 67 pages, XP008130642, Retrieved from the Internet: URL:http://www.ietf.org/rfc/rfc3748.txt [retrieved on Dec. 15, 2010].

(Continued)

*Primary Examiner* — Simon P Kanaan
(74) *Attorney, Agent, or Firm* — Linda G. Gunderson; Holland & Hart LLP

(57) ABSTRACT

Techniques are described for wireless communication. A method for wireless communication at a user equipment (UE) includes performing an extensible authentication protocol (EAP) procedure with an authentication server via an authenticator. The EAP procedure is based at least in part on a set of authentication credentials exchanged between the UE and the authentication server. The method also includes deriving, as part of performing the EAP procedure, a master session key (MSK) and an extended master session key (EMSK) that are based at least in part on the authentication credentials and a first set of parameters; determining a network type associated with the authenticator; and performing, based at least in part on the determined network type, at least one authentication procedure with the authenticator. The at least one authentication procedure is based on an association of the MSK or the EMSK with the determined network type.

36 Claims, 18 Drawing Sheets

(56) References Cited

U.S. PATENT DOCUMENTS

| | | | |
|---|---|---|---|
| 2006/0140150 A1* | 6/2006 | Olvera-Hernandez | ............... H04W 36/005 370/331 |
| 2007/0150723 A1* | 6/2007 | Estable | ............... H04L 63/0823 713/155 |
| 2008/0069105 A1* | 3/2008 | Costa | ............... H04L 63/0853 370/392 |
| 2012/0131329 A1* | 5/2012 | Liang | ............... H04L 12/4625 713/151 |
| 2015/0154895 A1* | 6/2015 | Cassidy | ............... G09F 7/18 40/606.01 |
| 2016/0127897 A1 | 5/2016 | Lee et al. | |
| 2016/0127903 A1 | 5/2016 | Lee et al. | |

OTHER PUBLICATIONS

International Search Report and Written Opinion—PCT/US2017/047355—ISA/EPO—dated Jan. 3, 2018.

* cited by examiner

TECHNIQUES FOR DERIVING SECURITY KEYS FOR A CELLULAR NETWORK BASED ON PERFORMANCE OF AN EXTENSIBLE AUTHENTICATION PROTOCOL (EAP) PROCEDURE

CROSS REFERENCES

The present Application for Patent claims priority to U.S. Provisional Patent Application No. 62/396,791 by LEE, et al., entitled "Techniques For Deriving Security Keys For A Cellular Network Based On Performance of an Extensible Authentication protocol (EAP) Procedure," filed Sep. 19, 2016, assigned to the assignee hereof.

BACKGROUND

Field of the Disclosure

The present disclosure, for example, relates to wireless communication systems, and more particularly to techniques for deriving security keys for a cellular network based on performance of an extensible authentication protocol (EAP) procedure.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may be or include a cellular network. A cellular network may include a number of network access devices, each simultaneously supporting communication for multiple communication devices, otherwise known as user equipment (UEs). In a fourth generation (4G) network, Long-Term Evolution (LTE) network, or LTE-Advanced (LTE-A) network, the network access devices may take the form of enhanced NodeBs (eNBs), with each eNB including a set of one or more base stations. In a fifth generation (5G or NextGen) network, the network access devices may take the form of smart radio heads (SRHs) or gNodeBs (gNBs) in communication with network access device controllers (e.g., access node controllers (ANCs)), in which a set of one or more network access devices, in communication with a network access device controller, define a network node. An eNB, gNB, or network node may communicate with a set of UEs on downlink channels (e.g., for transmissions from the eNB, gNB, or network node to the UEs) and uplink channels (e.g., for transmissions from the UEs to the eNBs, gNBs, or network nodes).

When a UE accesses a cellular network, the UE or cellular network may initiate one or more procedures that enable the UE to authenticate itself to an authenticator of the cellular network, and that enable the authenticator to authenticate the cellular network to the UE. In some examples, the authentication procedures may include an EAP procedure, in which an authentication server having a secure connection with the authenticator authenticates the UE; enables the UE to derive one or more security keys for authenticating itself to the authenticator; and derives one or more security keys that are transmitted to the authenticator over the secure connection, to enable the authenticator to authenticate the cellular network to the UE.

SUMMARY

In some cases, a cellular network may allow access to the cellular network via different types of access networks, some of which may be more or less vulnerable to attack, and some of which may be more or less under the control of an operator of the cellular network. For example, a cellular network may allow access to the cellular network via a cellular access network or a non-cellular access network (e.g., a wireless local area network (WLAN)). When the same EAP procedure is supported by authenticators associated with different access networks, the same master session key (MSK) may be derived as a result of performing the EAP procedure via an authenticator associated with a cellular access network or an authenticator associated with a non-cellular access network. Thus, the same MSK, or the same security key derived therefrom, may be provided to the authenticator associated with the cellular access network or the authenticator associated with the non-cellular access network. If the non-cellular access network is compromised by an attacker, the attacker's access to the MSK or security keys derived therefrom may enable the attacker to use the non-cellular access network to impersonate the cellular access network to a UE, which compromises the security of the UE and/or an application running on the UE. Techniques described in the present disclosure help mitigate such threats by determining the type of network associated with an authenticator and performing an authentication procedure with the authenticator (or deriving a security key for the authenticator) based on a type of EAP session key (e.g., an MSK or an extended MSK (EMSK)) associated with the type of network. In some examples, the MSK may be used when an authenticator is associated with a non-cellular access network, and the EMSK may be used when an authenticator is associated with a cellular access network.

In one example, a method for wireless communication at a UE is described. The method may include performing an EAP procedure with an authentication server via an authenticator. The EAP procedure may be based at least in part on a set of authentication credentials exchanged between the UE and the authentication server. The method may also include deriving, as part of performing the EAP procedure, an MSK and an EMSK that are based at least in part on the authentication credentials and a first set of parameters; determining a network type associated with the authenticator; and performing, based at least in part on the determined network type, at least one authentication procedure with the authenticator. The at least one authentication procedure may be based on an association of the MSK or the EMSK with the determined network type.

In one example, an apparatus for wireless communication at a UE is described. The apparatus may include means for performing an EAP procedure with an authentication server via an authenticator. The EAP procedure may be based at least in part on a set of authentication credentials exchanged between the UE and the authentication server. The apparatus may also include means for deriving, as part of performing the EAP procedure, an MSK and an EMSK that are based at least in part on the authentication credentials and a first set of parameters; means for determining the authenticator is associated with a cellular network; and means for performing at least one authentication procedure with the authenticator. The at least one authentication procedure may be based on an association of the MSK or the EMSK with the determined network type.

In one example, another apparatus for wireless communication at a UE is described. The apparatus may include a processor, and memory in electronic communication with the processor. The processor and the memory may be configured to perform an EAP procedure with an authentication server via an authenticator. The EAP procedure may be based at least in part on a set of authentication credentials exchanged between the UE and the authentication server. The processor and the memory may also be configured to derive, as part of performing the EAP procedure, an MSK and an EMSK that are based at least in part on the authentication credentials and a first set of parameters; determine a network type associated with the authenticator; and perform, based at least in part on the determined network type, at least one authentication procedure with the authenticator. The at least one authentication procedure may be based on an association of the MSK or the EMSK with the determined network type.

In one example, a non-transitory computer-readable medium storing computer-executable code for wireless communication at a UE is described. The code may be executable by a processor to perform an EAP procedure with an authentication server via an authenticator. The EAP procedure may be based at least in part on a set of authentication credentials exchanged between the UE and the authentication server. The code may also be executable by the processor to derive, as part of performing the EAP procedure, an MSK and an EMSK that are based at least in part on the authentication credentials and a first set of parameters; determine a network type associated with the authenticator; and perform, based at least in part on the determined network type, at least one authentication procedure with the authenticator. The at least one authentication procedure may be based on an association of the MSK or the EMSK with the determined network type.

In some examples of the method, apparatus, and non-transitory computer-readable medium described above, the determined network type may include a cellular network type and performing the at least one authentication procedure with the authenticator may include deriving a first security key for a cellular network. The first security key may be based at least in part on the EMSK and a second set of parameters. In some examples, the second set of parameters may include an identifier of the cellular network, at least one cellular network-specific parameter, at least one parameter exchanged between the UE and the cellular network, or a combination thereof.

In some examples of the method, apparatus, and non-transitory computer-readable medium described above, performing the at least one authentication procedure with the authenticator may include deriving a second security key for a network node of the cellular network, the second security key based at least in part on the first security key and a third set of parameters; and communicating with the cellular network via the network node based at least in part on the second security key. In some of these examples, the third set of parameters may include an identifier of the network node, at least one network node-specific parameter, at least one parameter exchanged between the UE and the network node, or a combination thereof.

In some examples of the method, apparatus, and non-transitory computer-readable medium described above, the first set of parameters may include at least one identifier, at least one random number, at least one network parameter, at least one UE parameter, or a combination thereof.

In some examples of the method, apparatus, and non-transitory computer-readable medium described above, the cellular network may include at least one of a 5G network, a 4G network, an LTE network, an LTE-A network, a 3G network, or a combination thereof.

In some examples of the method, apparatus, and non-transitory computer-readable medium described above, the determined network type may include a non-cellular network type and performing the at least one authentication procedure with the authenticator may include deriving a first security key for a non-cellular network. The first security key may be based at least in part on the MSK and a second set of parameters.

In one example, a method for wireless communication at an authentication server may include performing an EAP procedure with a UE via an authenticator. The EAP procedure may be based at least in part on a set of authentication credentials exchanged between the authentication server and the UE. The method may also include deriving, as part of performing the EAP procedure, an MSK and an EMSK that are based at least in part on the authentication credentials and a first set of parameters; determining a network type associated with the authenticator; deriving a security key for the determined network type based at least in part on an association of the MSK or the EMSK with the network type, and based at least in part on a second set of parameters; and transmitting the security key to the authenticator via a secure channel.

In one example, an apparatus for wireless communication at an authentication server is described. The apparatus may include means for performing an EAP procedure with a UE via an authenticator. The EAP procedure may be based at least in part on a set of authentication credentials exchanged between the authentication server and the UE. The apparatus may also include means for deriving, as part of performing the EAP procedure, an MSK and an EMSK that are based at least in part on the authentication credentials and a first set of parameters; means for determining a network type associated with the authenticator; means for deriving a security key for the determined network type based at least in part on an association of the MSK or the EMSK with the network type, and based at least in part on a second set of parameters; and means for transmitting the security key to the authenticator via a secure channel.

In one example, another apparatus for wireless communication at an authentication server is described. The apparatus may include a processor, and memory in electronic communication with the processor. The processor and the memory may be configured to perform an EAP procedure with a UE via an authenticator. The EAP procedure maybe based at least in part on a set of authentication credentials exchanged between the authentication server and the UE. The processor and the memory may also be configured to derive, as part of performing the EAP procedure, an MSK and an EMSK that are based at least in part on the authentication credentials and a first set of parameters; determine a network type associated with the authenticator; derive a security key for the determined network type based at least in part on an association of the MSK or the EMSK with the determined network type, and based at least in part on a second set of parameters; and transmit the security key to the authenticator via a secure channel.

In one example, a non-transitory computer-readable medium storing computer-executable code for wireless communication at an authentication server is described. The code may be executable by a processor to perform an EAP procedure with a UE via an authenticator. The EAP procedure may be based at least in part on a set of authentication credentials exchanged between the authentication server and the UE. The code may also be executable by the processor to derive, as part of performing the EAP procedure, an MSK and an EMSK that are based at least in part on the authentication credentials and a first set of parameters; determine a network type associated with the authenticator; derive a security key for the determined network type based at least in part on an association of the MSK or the EMSK with the determined network type, and based at least in part on a second set of parameters; and transmit the security key to the authenticator via a secure channel.

In some examples of the method, apparatus, and non-transitory computer-readable medium described above, the first set of parameters may include at least one identifier, at least one random number, at least one network parameter, at least one UE parameter, or a combination thereof.

In some examples of the method, apparatus, and non-transitory computer-readable medium described above, the determined network type may include a cellular network type and the second set of parameters may include an identifier of the cellular network, at least one cellular network-specific parameter, at least one parameter exchanged between the authentication server and the cellular network, or a combination thereof.

In some examples of the method, apparatus, and non-transitory computer-readable medium described above, the cellular network may include at least one of a 5G network, a 4G network, an LTE network, an LTE-A network, a 3G network, or a combination thereof.

In one example, a method for wireless communication at a cellular network is described. The method may include receiving, from an authentication server, a first security key based at least in part on an EMSK and a first set of parameters. The EMSK may be based at least in part on a set of authentication credentials and a second set of parameters. The authentication credentials may be exchanged between a UE and the authentication server during an EAP procedure. The method may also include performing at least one authentication procedure with the UE based at least in part on the first security key.

In one example, an apparatus for wireless communication at a cellular network is described. The apparatus may include means for receiving, from an authentication server, a first security key based at least in part on an EMSK and a first set of parameters. The EMSK may be based at least in part on a set of authentication credentials and a second set of parameters. The authentication credentials may be exchanged between a UE and the authentication server during an EAP procedure. The apparatus may also include means for performing at least one authentication procedure with the UE based at least in part on the first security key.

In one example, another apparatus for wireless communication at a cellular network is described. The apparatus may include a processor, and memory in electronic communication with the processor. The processor and the memory may be configured to receive, from an authentication server, a first security key based at least in part on an EMSK and a first set of parameters. The EMSK may be based at least in part on a set of authentication credentials and a second set of parameters. The authentication credentials may be exchanged between a UE and the authentication server during an EAP procedure. The processor and the memory may also be configured to perform at least one authentication procedure with the UE based at least in part on the first security key.

In one example, a non-transitory computer-readable medium storing computer-executable code for wireless communication at a cellular network is described. The code may be executable by a processor to receive, from an authentication server, a first security key based at least in part on an EMSK and a first set of parameters. The EMSK may be based at least in part on a set of authentication credentials and a second set of parameters. The authentication credentials may be exchanged between a UE and the authentication server during an EAP procedure. The code may also be executable to perform at least one authentication procedure with the UE based at least in part on the first security key.

In some examples of the method, apparatus, and non-transitory computer-readable medium described above, performing the at least one authentication procedure with the UE may include deriving a second security key for a network node of the cellular network, the second security key based at least in part on the first security key and a third set of parameters; and communicating with the UE via the network node based at least in part on the second security key. In some examples, the third set of parameters may include an identifier of the network node, at least one network node-specific parameter, at least one parameter exchanged between the UE and the network node, or a combination thereof.

In some examples of the method, apparatus, and non-transitory computer-readable medium described above, the second set of parameters may include an identifier of the cellular network, at least one cellular network-specific parameter, at least one parameter exchanged between the UE and the cellular network, or a combination thereof.

In some examples of the method, apparatus, and non-transitory computer-readable medium described above, the first set of parameters may include at least one identifier, at least one random number, at least one network parameter, at least one UE parameter, or a combination thereof.

In some examples of the method, apparatus, and non-transitory computer-readable medium described above, the cellular network may include at least one of a 5G network, a 4G network, an LTE network, an LTE-A network, a 3G network, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques described in the present disclosure enable UEs to perform EAP procedures with an authentication server via authenticators associated with different types of access networks. Upon successful performance of an EAP procedure via an authenticator, a UE and authentication server may derive security keys for the authenticator based at least in part on a type of network associated with the authenticator. In some examples, the UE and authentication server may derive security keys for the authenticator based on an MSK when the authenticator is associated with a non-cellular access network, and may derive security keys for the authenticator based on an EMSK when the authenticator is associated with a cellular access network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

Figure 1:
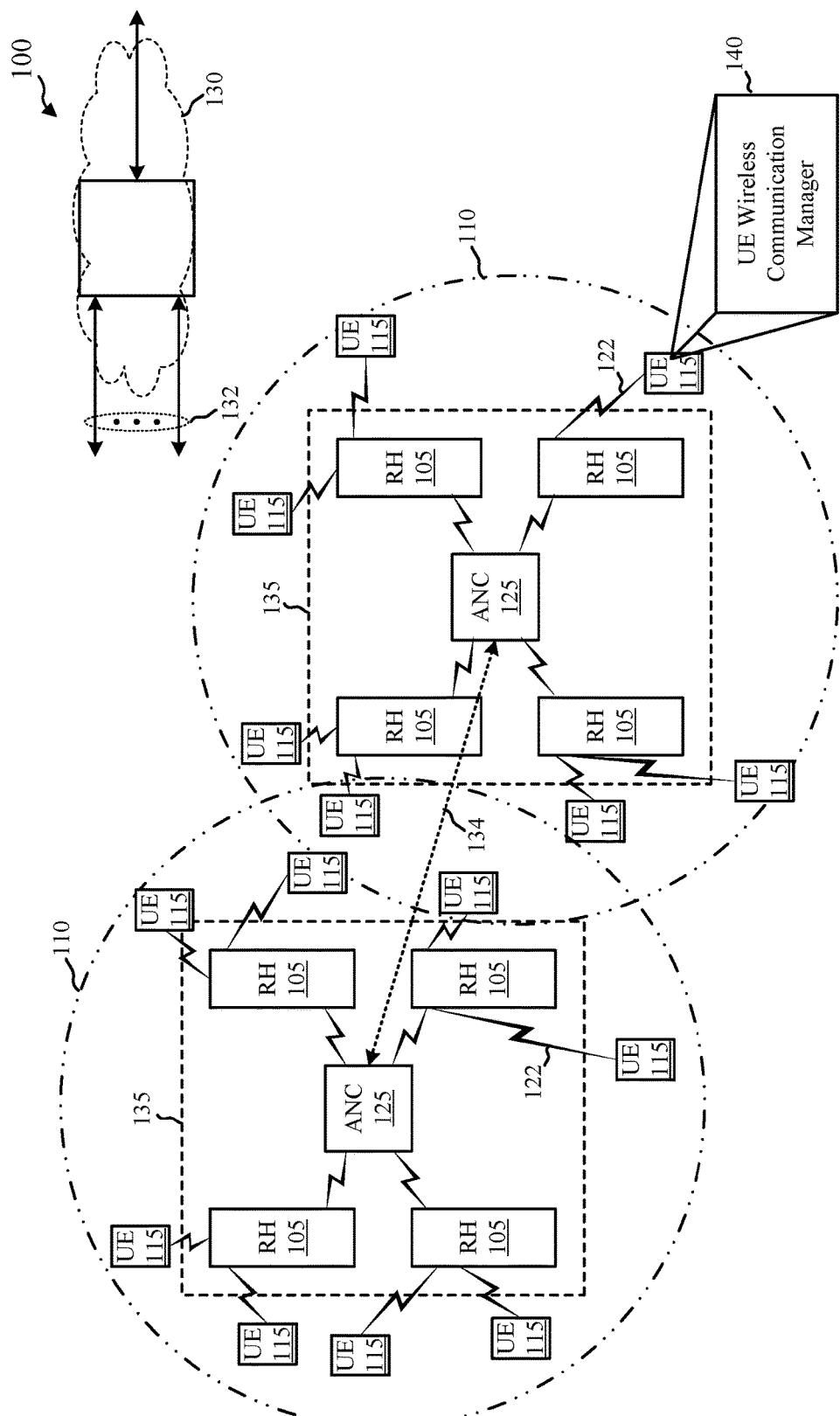
FIG. 1 illustrates an example of a wireless communication system, in accordance with various aspects of the present disclosure.

FIG. 1 illustrates an example of a wireless communication system 100, in accordance with various aspects of the disclosure. The wireless communication system 100 may include network access devices (e.g., distributed network access devices, distributed units, gNBs, radio heads (RHs), SRHs, transmission/reception points (TRPs), edge nodes, edge units, etc.) 105, UEs 115, network access device controllers (e.g., centralized network access devices, central nodes, central units, access node controllers (ANCs), etc.) 125, and a core network 130. The core network 130 may provide user authentication, access authorization, tracking, Internet Protocol (IP) connectivity, and other access, routing, or mobility functions. The network access device controllers 125 may interface with the core network 130 through backhaul links 132 (e.g., S1, S2, etc.) and may perform radio configuration and scheduling for communication with the UEs 115. In various examples, the network access device controllers 125 may communicate, either directly or indirectly (e.g., through core network 130), with each other over backhaul links 134 (e.g., X1, X2, etc.), which may be wired or wireless communication links. Each network access device controller 125 may also communicate with a number of UEs 115 through a number of network access devices (e.g., RHs) 105. In an alternative configuration of the wireless communication system 100, the functionality of a network access device controller 125 may be provided by a network access device 105 or distributed across the network access devices 105 of a network node (e.g., an access node, a New Radio Base Station (NR BS), etc.) 135. In another alternative configuration of the wireless communication system 100, the network nodes 135 may be replaced by eNBs, the network access devices 105 may be replaced with base stations, and the network access device controllers 125 may be replaced by base station controllers (or links to the core network 130).

The network access device controllers 125 may communicate with the UEs 115 via one or more network access devices 105, with each network access device 105 having one or more antennas for wirelessly communicating with a number of UEs 115. Each of the network nodes 135 may provide communication coverage for a respective geographic coverage area 110, and may provide one or more remote transceivers associated with one or more network access devices 105. A network access device 105 may perform many of the functions of a LTE/LTE-A base station. In some examples, a network access device controller 125 may be implemented in distributed form, with a portion of the network access device controller 125 being provided in each network access device 105. The geographic coverage area 110 for a network node 135 may be divided into sectors making up only a portion of the coverage area (not shown), and in some examples a geographic coverage area 110 for a network node 135 may be formed from a set of geographic coverage areas for a set of network access devices 105 associated with the network node 135 (not shown). In some examples, the network access devices 105 may be replaced with alternative network access devices, such as base transceiver stations, radio base stations, access points, radio transceivers, NodeBs, eNBs, Home NodeBs, Home eNodeBs, gNBs, etc. The wireless communication system 100 may include network access devices 105 (or base stations or other network access devices) of different types (e.g., macro cell and/or small cell network access devices). The geographic coverage areas of the network access devices 105 and/or network nodes 135 may overlap. In some examples, different network access devices 105 may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of network access devices 105 or network nodes 135 provide coverage for various geographical regions. For example, each network access device 105 or network node 135 may provide communication coverage for a macro cell, a small cell, and/or other types of cell. The term "cell" may be used to describe a base station, an RH, a carrier or component carrier associated with a base station or an RH, or a coverage area (e.g., sector, etc.) of a carrier or base station, depending on context.

A macro cell may cover a relatively large geographic area (e.g., several kilometers in radius) and may allow access by UEs 115 with service subscriptions with a network provider. A small cell may include a lower-powered RH or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A network access device for a macro cell may be referred to as a macro network access device. A network access device for a small cell may be referred to as a small cell network access device, a pico network access device, a femto network access device, or a home network access device. A network access device may support one or multiple (e.g., two, three, four, and the like) cells (e.g., component carriers).

The wireless communication system 100 may support synchronous or asynchronous operation. For synchronous operation, the network nodes 135 or network access devices 105 may have similar frame timing, and transmissions from different network access devices 105 may be approximately aligned in time. For asynchronous operation, the network nodes 135 or network access devices 105 may have different frame timings, and transmissions from different network access devices 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network access device 105, network access device controller 125, or the core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, an automobile, an appliance, or other electronic device having a wireless communication interface. A UE may be able to communicate with various types of network nodes 135 or network access devices 105, including small cell nodes, relay nodes, and the like. A UE may also be able to communicate directly with other UEs (e.g., using a peer-to-peer (P2P) protocol).

The communication links 122 shown in wireless communication system 100 may include uplink (UL) channels, from a UE 115 to a network access device 105, and/or downlink (DL) channels, from a network access device 105 to a UE 115. The downlink channels may also be called forward link channels, while the uplink channels may also be called reverse link channels.

Each communication link 122 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 122 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the network access devices 105 and/or UEs 115 may include multiple antennas for employing antenna diversity schemes to improve communication quality and reliability between network access devices 105 and UEs 115. Additionally or alternatively, network access devices 105 and/or UEs 115 may employ multiple-input multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

One or more of the UEs 115 may include a wireless communication manager 140. In some examples, the wireless communication manager 140 may be used to perform an EAP procedure with an authentication server via an authenticator associated with the core network 130. The authentication server may be accessed via the core network 130, as described with reference to FIG. 2. The EAP procedure may be based at least in part on a set of authentication credentials exchanged between the UE and the authentication server. The wireless communication manager 140 may also be used to derive, as part of performing the EAP procedure, an MSK and an EMSK that are based at least in part on the authentication credentials and a first set of parameters (collectively referred to as an EAP method or authentication method); determine the authenticator is associated with a cellular network; and perform at least one authentication procedure with the cellular network based at least in part on the EMSK. In some examples, the wireless communication manager 140 may be an example of aspects of the wireless communication managers described with reference to FIGS. 6-8.

Figure 2:
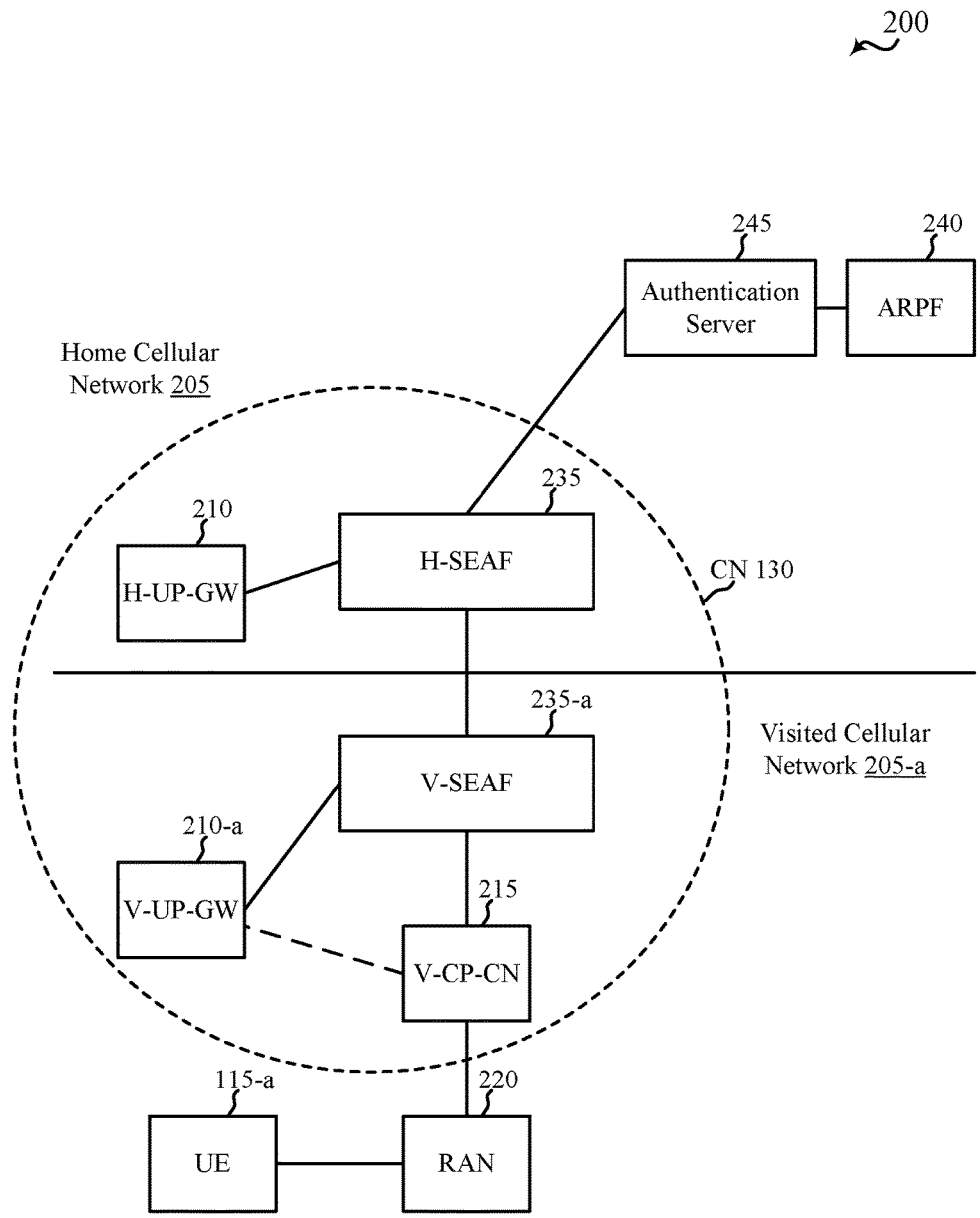
FIG. 2 illustrates an example of a wireless communication system, in accordance with various aspects of the present disclosure.

FIG. 2 illustrates an example of a wireless communication system 200, in accordance with various aspects of the present disclosure. The wireless communication system 200 may include a home cellular network 205 of a UE 115-*a*, and a cellular network visited by the UE 115-*a* (i.e., a visited cellular network 205-*a*).

The home cellular network 205 may include a first authenticator 235 (e.g., a server or device providing a home security anchor function (H-SEAF)) and a home user plane gateway (H-UP-GW) 210. Persons skilled in the art will appreciate that the home cellular network 205 may also include other servers or devices that provide other functions (not shown). The visited cellular network 205-*a* may include a second authenticator 235-*a* (e.g., a server or device providing a visiting SEAF (V-SEAF)), a visited UP-GW (V-UP-GW) 210-*a*, a visited cellular network control plane core network function (V-CP-CN) 215, and a radio access network (RAN) 220. In some examples, the RAN 220 may include one or more of the network nodes 135, network access devices 105, and network access device controllers 125 described with reference to FIG. 1. The first authenticator 235, H-UP-GW 210, second authenticator 235-*a*, V-UP-GW 210-*a*, and V-CP-CN 215 may be exemplary components of the core network 130 described with reference to FIG. 1.

The home cellular network 205 may be in communication with (or may provide) an authentication server 245. The authentication server 245 may provide an authentication server function (AUSF). The authentication server 245 may access and/or invoke an authentication credential repository and processing function (ARPF) 240.

The UE 115-*a* may connect to the visited cellular network 205-*a* via a node (e.g., a network access device) of the RAN 220. FIG. 2 presumes that the UE 115-*a* accessed the visited cellular network 205-*a* while operating in a roaming mode. In a non-roaming scenario, the UE 115-*a* may access the home cellular network 205 instead of the visited cellular network 205-*a* via a RAN of the home cellular network 205 (not shown in FIG. 2).

The V-CP-CN 215 may include or manage one or more aspects of mobility management (MM) functions and/or session management (SM) functions for the UE 115-*a*, as well as maintain the corresponding security contexts. The second authenticator 235-*a* may facilitate and manage authentication of the UE 115-*a* by the visited cellular network 205-*a*, and may maintain an anchor session key from which subsequent security keys may be derived. The V-UP-GW 210-*a* may maintain a user plane security context (e.g., a security key) for the UE 115-*a* when user plane security terminates at the V-UP-GW 210-*a*. The user plane security may be terminated by the RAN 220 and/or the V-UP-GW 210-*a* and may be configured by the network. Generally, the UE 115-*a* may maintain a security context with each node of the visited cellular network 205-*a*.

Upon accessing the visited cellular network 205-*a*, the second authenticator 235-*a* may facilitate an EAP procedure performed by the UE 115-*a* and the authentication server 245. The second authenticator 235-*a* may establish or maintain, via the first authenticator 235 (of the home cellular network 205), a secure channel for performing the EAP procedure with the authentication server 245.

The EAP procedure performed by the UE 115-*a* and the authentication server 245 may be based at least in part on a set of authentication credentials exchanged between the UE 115-*a* and the authentication server 245. As part of performing the EAP procedure, the UE 115-*a* and authentication server 245 may each derive an MSK and an EMSK. The MSK and the EMSK may be based at least in part on the authentication credentials and the first set of parameters. In some examples, the first set of parameters may include at least one identifier, at least one random number, at least one network parameter, at least one UE parameter, or a combination thereof.

When the EAP procedure is successful (e.g., when the UE 115-*a* and authentication server 245 successfully authenticate one another), the authentication server 245 may transmit a session anchor key (e.g., a first security key) to the second authenticator 235-*a*. In accordance with the techniques described in the present disclosure, the session anchor key may be based at least in part on the EMSK. The session anchor key may also be based at least in part on a second set of parameters. The second set of parameter may include an identifier of the visited cellular network 205-*a*, at least one cellular network-specific parameter, at least one parameter exchanged between the UE 115-*a* and the second cellular network 205-*a*, or a combination thereof.

The UE 115-*a* may independently derive the session anchor key. Based at least in part on the session anchor key, the UE 115-*a* and second authenticator 235-*a* may authenticate each other and derive additional security keys (e.g., security keys for other nodes or functions of the second cellular network 205-*a*), as shown in FIG. 3.

In an alternative to what is shown in FIG. 2, the servers or devices providing the H-SEAF and V-SEAF may not assume the role of authenticator in an EAP procedure performed between the UE 115-*a* and the authentication server 245, and instead, an authenticator may be collocated with the authentication server 245 (e.g., the server providing the AUSF). In these examples, the authentication server 245 may derive a session anchor key for the H-SEAF or V-SEAF based on the MSK or EMSK and the second set of parameters, and transmit the session anchor key to the H-SEAF (in a non-roaming scenario) or the V-SEAF (in a roaming scenario).

Figure 3:
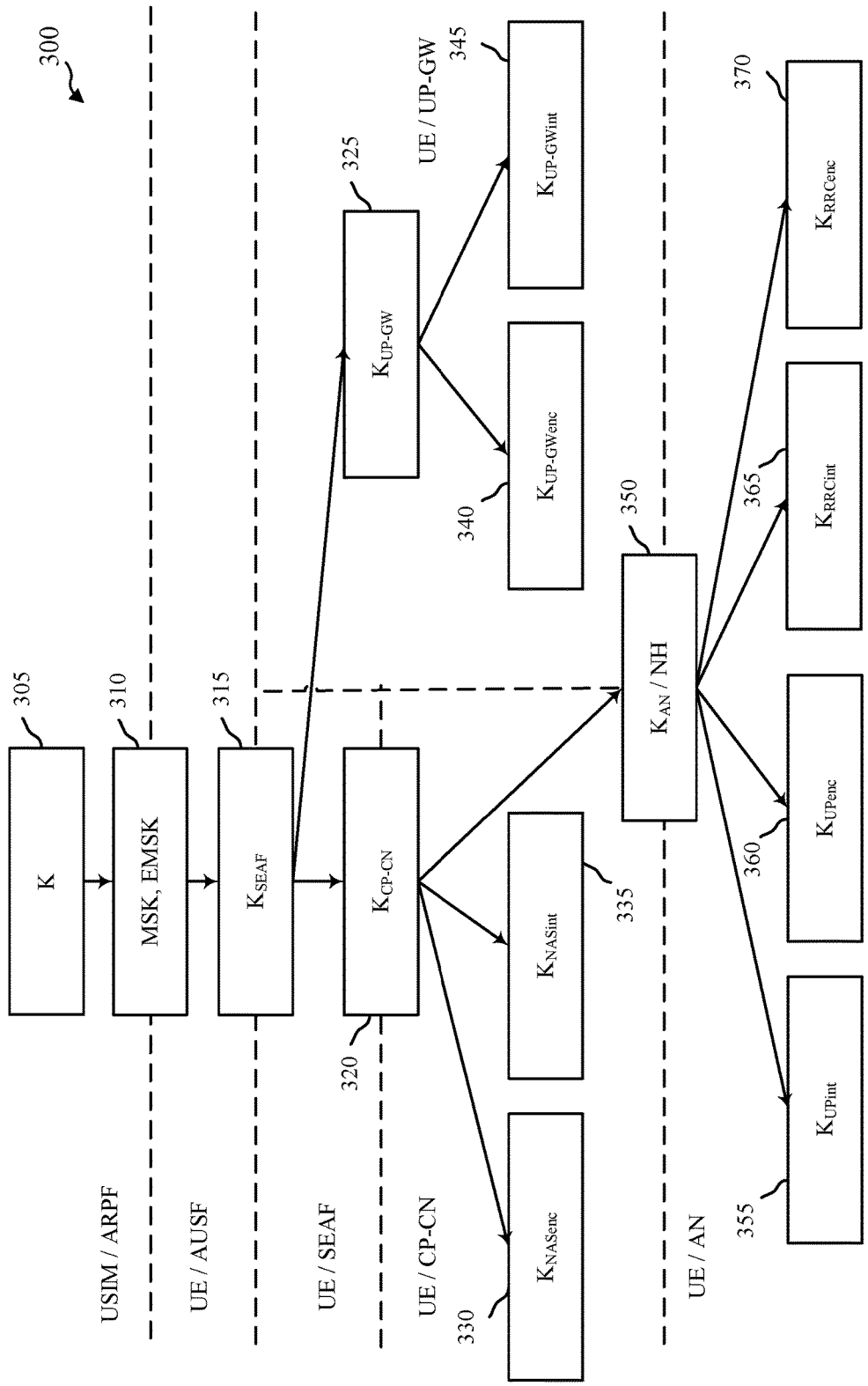
FIG. 3 illustrates an example of a key hierarchy for a wireless communication system, in accordance with various aspects of the present disclosure.

FIG. 3 illustrates an example of a key hierarchy 300 for a wireless communication system, in accordance with various aspects of the present disclosure. This solution provides serving network binding to the key delivered to the 3GPP serving network for general EAP protocols by using an EMSK to derive the key (e.g., $K_{SEAF}$) that is passed down from the EAP server (e.g., the authentication server 245 described with reference to FIG. 2). In some examples, the key hierarchy 300 may be used by the wireless communication systems 100 and 200 described with reference to FIGS. 1 and 2. For example, a UE and/or network nodes may use the key hierarchy 300 to implement one or more aspects of the authentication or security functions described with reference to FIGS. 1 and 2.

The key hierarchy 300 may include a K root key 305 used as a security context between a universal subscriber identity module (USIM) and an ARPF. The K root key 305 may be used as a basis for performing an EAP procedure and deriving keys 310 (e.g., an MSK and an EMSK) to provide a security context between an authentication server and a UE (e.g., between the authentication server 245 and UE 115-a described with reference to FIG. 2). The K root key 305 may be used for performing a shared key-based EAP procedure, but one or more other keys (e.g., a key derived based on certificates) may be used when performing a certificate-based EAP procedure. The EMSK may be used by the authentication server (e.g., an AUSF) and UE to derive a $K_{SEAF}$ anchor session key 315 for an authenticator (e.g., for the second authenticator 235-a described with reference to FIG. 2). Because the EMSK (rather than the MSK) is used to derive $K_{SEAF}$, there may be no need to restrict the use of credentials to 3GPP access. For example, when a non-3GPP entity obtains the MSK based on EAP authentication, the non-3GPP entity cannot derive $K_{SEAF}$ because $K_{SEAF}$ is derived from the EMSK that is not known to the non-3GPP entity. The $K_{SEAF}$ anchor session key 315 may be maintained by the authenticator and the UE.

The $K_{SEAF}$ anchor session key 315 may be used by the authenticator to derive a $K_{CP-CN}$ key 320 and a $K_{UP-GW}$ key 325. The $K_{CP-CN}$ key 320 may be maintained by a CP-CN function (e.g., the V-CP-CN 215 described with reference to FIG. 2) and the UE. The $K_{UP-GW}$ key 325 may be maintained by a UP-GW function (e.g., the V-UP-GW 210-a described with reference to FIG. 2) and the UE. The $K_{UP-GW}$ key 325 may be used by the UP-GW to establish the $K_{UP-GWenc}$ key 340 and the $K_{UP-GWint}$ key 345. The $K_{UP-Gwen}$ key 340 and the $K_{UP-GWint}$ key 345 may be used for integrity protection and encoding of user plane packets.

The $K_{CP-CN}$ key 320 may be used by the CP-CN function to derive the $K_{NASenc}$ key 330, the $K_{NASint}$ key 335, and the $K_{AN}$/NH key 350. The $K_{AN}$/NH key 350 may be used by the access node to derive the $K_{UPint}$ key 355, the $K_{UPenc}$ key 360, the $K_{RRCint}$ key 365, and the $K_{RRCenc}$ key 370, which may be used for integrity protection and encoding of RRC and user plane packets.

Figure 4:
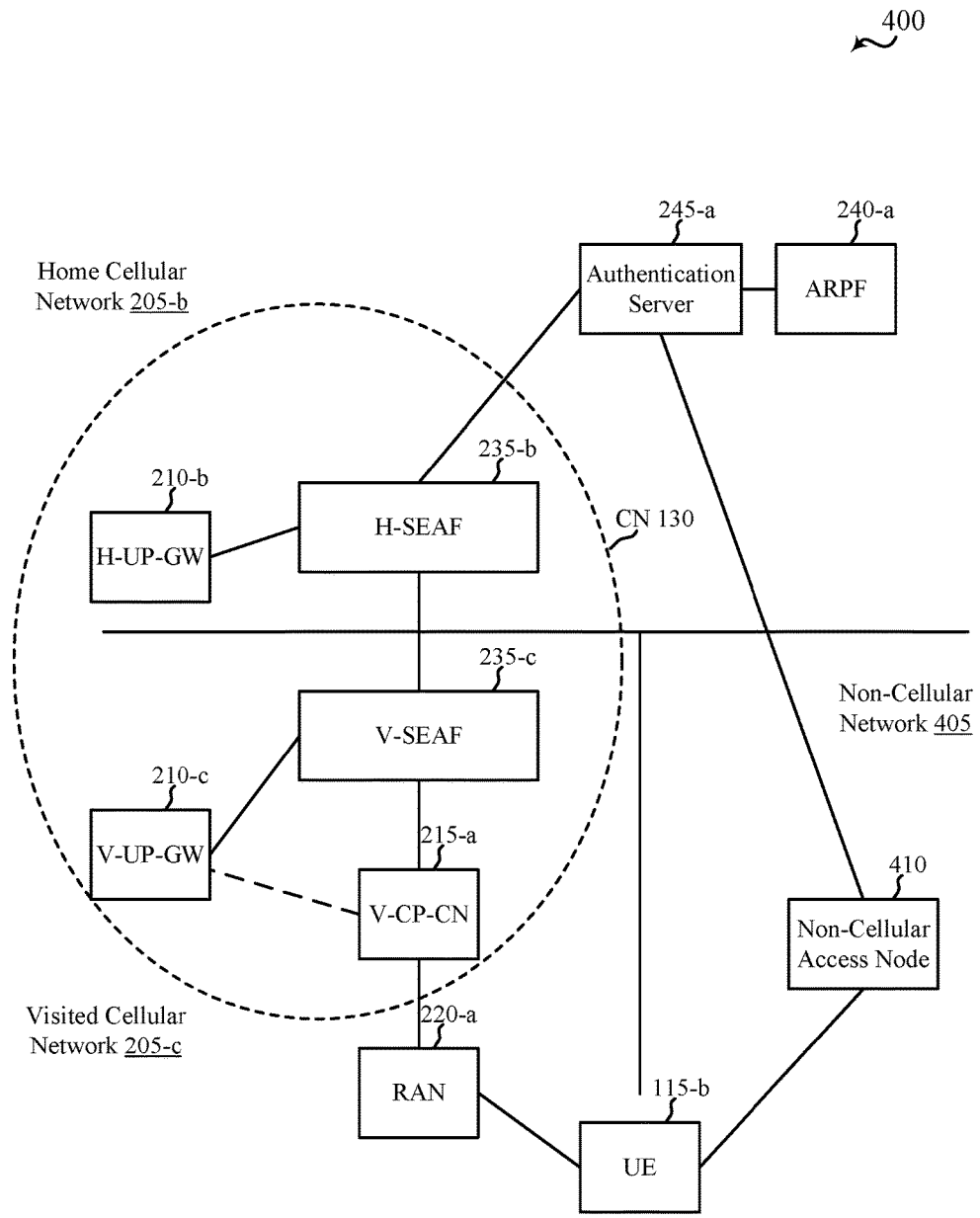
FIG. 4 illustrates an example of a wireless communication system, in accordance with various aspects of the present disclosure.

FIG. 4 illustrates an example of a wireless communication system 400, in accordance with various aspects of the present disclosure. The wireless communication system 400 may include a home cellular network 205-b of a UE 115-b, and a cellular network visited by the UE 115-b (i.e., a visited cellular network 205-c).

The home cellular network 205-b may include a first authenticator 235-b (e.g., a server or device providing a H-SEAF) and a H-UP-GW 210-b. The home cellular network 205-b may also include other servers or devices that provide other functions (not shown). The visited cellular network 205-c may include a second authenticator 235-c (e.g., a server or device providing a V-SEAF), a V-UP-GW 210-c, a V-CP-CN 215-a, and a RAN 220-a. In some examples, the RAN 220-a may include one or more of the network nodes 135, network access devices 105, and network access device controllers 125 described with reference to FIG. 1. The first authenticator 235-b, H-UP-GW 210-b, second authenticator 235-c, V-UP-GW 210-c, and V-CP-CN 215-a may be exemplary components of the core network 130 described with reference to FIG. 1.

The home cellular network 205-b may be in communication with (or may provide) an authentication server 245-a. The authentication server 245-a may provide an AUSF. The authentication server 245-a may access and/or invoke an ARPF 240-a.

Each of the first authenticator 235-b, the H-UP-GW 210-b, the second authenticator 235-c, the V-UP-GW 210-c, the V-CP-CN 215-a, the RAN 220-a, the authentication server 245-a, and the ARPF 240-a may be examples of the similarly numbered components, functions, or nodes described with reference to FIG. 2.

FIG. 4 also shows a non-cellular network 405 that includes a non-cellular access node 410 (e.g., a WLAN access point (AP) or wireless LAN controller (WLC)). As shown, the UE 115-b may connect to the RAN 220-a or to the non-cellular access node 410, and in each case, the same authentication server 245-a may perform an EAP procedure with the UE 115-b. When the UE 115-b connects to the RAN 220-a, the second authenticator 235-c may serve as the authenticator in an EAP procedure performed by the UE 115-b and the authentication server 245-a. When the UE 115-b connects to the non-cellular access node 410, the non-cellular access node 410 may serve as the authenticator in an EAP procedure performed by the UE 115-b and the authentication server 245-a.

If the UE 115-b and authentication server 245-a are both capable of performing the same EAP procedure and deriving the same session anchor key (e.g., for performing an authentication procedure between the UE 115-b and the second authenticator 235-c, or for performing an authentication procedure between the UE 115-b and the non-cellular access node 410), an attacker that compromises the non-cellular access node 410 may be able to obtain the session anchor key from the non-cellular access node 410 and use it to impersonate a node of the visited cellular network 205-c or home cellular network 205-b. To resolve the afore-mentioned issue, the UE 115-b and authentication server 245-a may determine the type of network associated with an authenticator (e.g., the type of network associated with the second authenticator 235-c or the non-cellular access node 410) and determine which key to use (between an MSK and an EMSK) to derive a session anchor key (i.e., derive the session anchor key based on the type of network). In some examples, the MSK may be used when an authenticator (e.g., the non-cellular access node 410) is associated with a non-cellular access network (e.g., the non-cellular network 405), and the EMSK may be used when an authenticator (e.g., the second authenticator 235-c) is associated with a cellular access network (e.g., the visited cellular network 205-c). In addition, a session anchor key derived for an authenticator associated with a cellular network may be derived based at least in part on a set of parameters associated with the cellular network. For example, a $K_{SEAF}$ key may be derived by the UE 115-b and the authentication server 245-a based on the key derivation formula (KDF)

$$K_{SEAF}=\text{KDF}(\text{EMSK},\text{PLMN ID},CTX)$$

where PLMN ID is a public land mobile network identifier associated with the serving (e.g., visited) cellular network 205-b and provided to the authentication server 245-a during the EAP procedure, and CTX is a context describing an access technology (e.g., cellular network access, such as 5G (NextGen), 4G, LTE/LTE-A, or 3G network access). Persons skilled in the art will appreciate that the $K_{SEAF}$ may also be derived based at least in part on other suitable parameters.

By deriving the session anchor key for an authenticator based on a type of network associated with the authenticator, a network of one network type is unable to obtain a session anchor key for a network of another type and impersonate a node of a different network type. Therefore, the same EAP procedure (or authentication method) can be used for networks of different types without affecting the security of the networks of different types.

Figure 5:
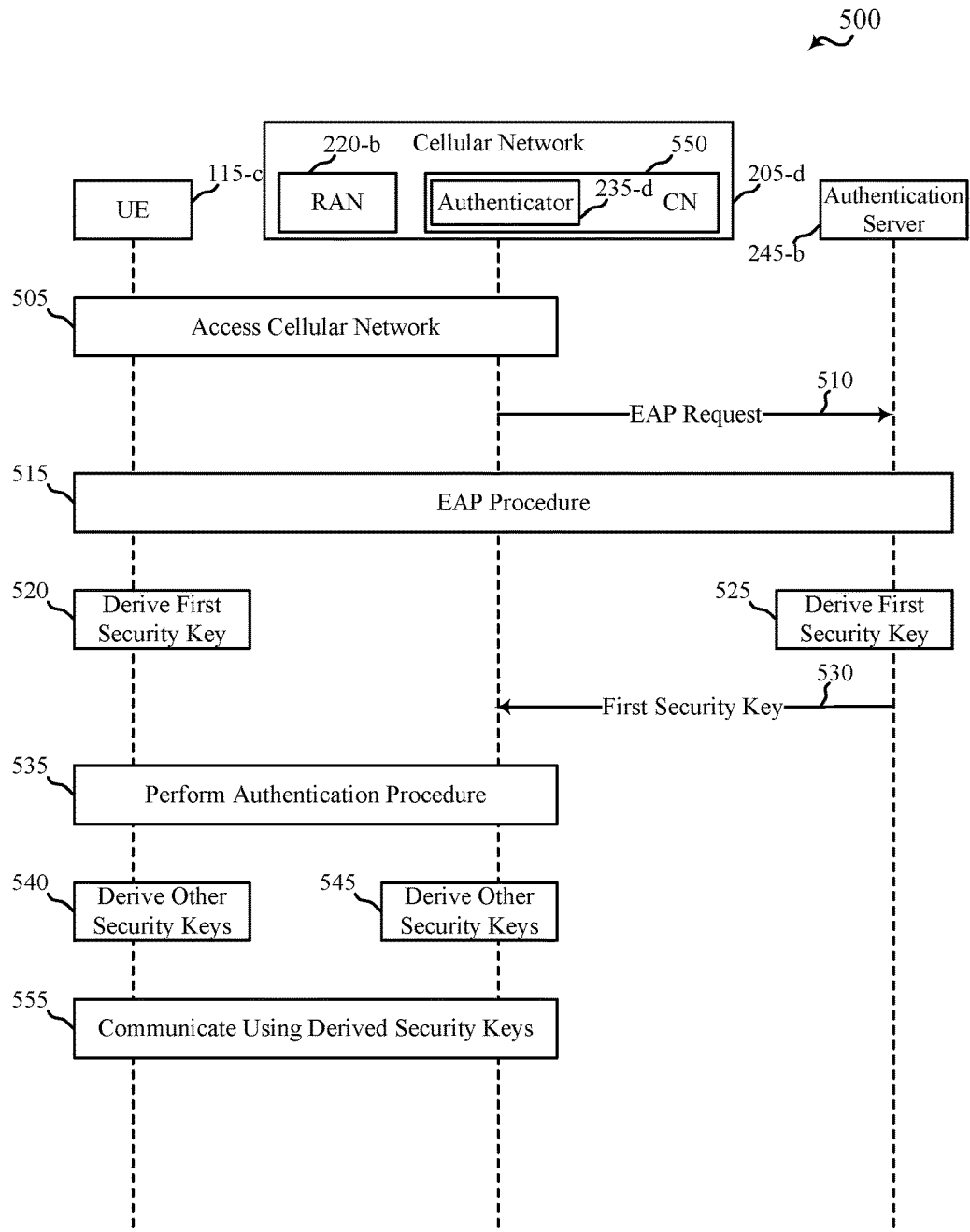
FIG. 5 shows an example message flow between a UE, a cellular network, and an authentication server, in accordance with various aspects of the present disclosure.

FIG. 5 shows an example message flow 500 between a UE 115-c, a cellular network 205-d, and an authentication server 245-b, in accordance with various aspects of the present disclosure. The UE 115-c may be an example of aspects of the UEs 115 described with reference to FIGS. 1, 2, and 4. The cellular network 205-d may be an example of the cellular networks 205 described with reference to FIGS. 2 and 4, and in some cases may include at least one of a 5G network, a 4G network, a LTE network, a LTE-A network, a 3G network, or a combination thereof. The authentication server 245-b may be an example of aspects of the authentication servers 245 described with reference to FIGS. 2 and 4. The cellular network 205-d may include a RAN 220-b and a cellular CN 550. The RAN 220-b and CN 550 may be examples of the RANs 220 and CNs described with reference to FIGS. 2 and 4. In some examples, the RAN 220-b may include one or more of the network nodes 135, network access devices 105, or network access device controllers 125 described with reference to FIG. 1. The CN 550 may include an authenticator 235-d (e.g., a node of the CN 550), which may be an example of aspects of the authenticators 235 described with reference to FIGS. 2 and 4.

At 505, the UE 115-c may access the cellular network 205-d, and the UE 115-c or the cellular network 205-d may initiate an EAP procedure. In some examples, the UE 115-c may access the cellular network 205-d via a network access device (e.g., a network node) of the RAN 220-b. The RAN 220-b may be in communication with the CN 550. The authenticator 235-d within the CN 550 may facilitate the performance of the EAP procedure. In an alternative configuration of the cellular network, the authenticator 235-d may be part of the RAN 220-b or collocated with the authentication server 245-b.

At 510, the cellular network 205-d may transmit a request to perform an EAP procedure to the authentication server 245-b. In some examples, the request transmitted at 510 may be transmitted over a secure channel between the authenticator 235-d and the authentication server 245-b (e.g., the request may be transmitted between the authenticator 235-d and the authentication server 245-b using a Diameter protocol (e.g., using Diameter encapsulation)).

At 515, the UE 115-c and authentication server 245-b may perform an EAP procedure via the authenticator 235-d, with the authenticator 235-d providing transport for messages transmitted between the UE 115-c and the authentication server 245-b. The EAP procedure may be based at least in part on a set of authentication credentials exchanged between the UE 115-c and the authentication server 245-b. As a part of performing the EAP procedure, each of the UE 115-c and the authentication server 245-b may derive an MSK and an EMSK. The MSK and EMSK may be derived based at least in part on the authentication credentials and a first set of parameters. In some examples, the first set of parameters may include at least one identifier, at least one random number, at least one network parameter, at least one UE parameter, or a combination thereof.

Before, during, or after the operation(s) at 505, 510, or 515, the UE 115-c and authentication server 245-b may each determine that the authenticator 235-d is associated with a cellular network (i.e., with the cellular network 205-d).

At 520 and 525, each of the UE 115-c and the authentication server 245-b may independently derive a first security key for the cellular network 205-d. Because the UE 115-c and the authentication server 245-b each determine that the authenticator 235-d is associated with the cellular network 205-d, each of the UE 115-c and the authentication server 245-b may derive the first security key based at least in part on the EMSK. The first security key may also be derived based at least in part on a second set of parameters. In some examples, the second set of parameters may include an identifier of the cellular network 205-d, at least one cellular network-specific parameter, at least one parameter exchanged between the UE 115-c or authentication server 245-b and the cellular network 205-c, or a combination thereof.

At 530, the authentication server 245-b may transmit the first security key to the authenticator 235-d via the secure channel between the authenticator 235-d and the authentication server 245-b (e.g., the first security key may be transmitted between the authentication server 245-b and the authenticator 235-d using the Diameter protocol (e.g., using Diameter encapsulation)).

At 535, the UE 115-c and the cellular network 205-d may perform an authentication procedure. At 540 and 545, upon successfully performing the authentication procedure at 535, the UE 115-c and the cellular network 205-d may derive one or more additional security keys (e.g., a second security key) for a network node or nodes of the cellular network 205-d. In some examples, the second security key may be based at least in part on the first security key and a third set of parameters. In some examples, the third set of parameters may include an identifier of the network node, at least one network node-specific parameter, at least one parameter exchanged between the UE 115-c and the network node, or a combination thereof.

At 555, the UE 115-c may communicate with the cellular network 205-d based at least in part on the derived security keys.

Figure 6:
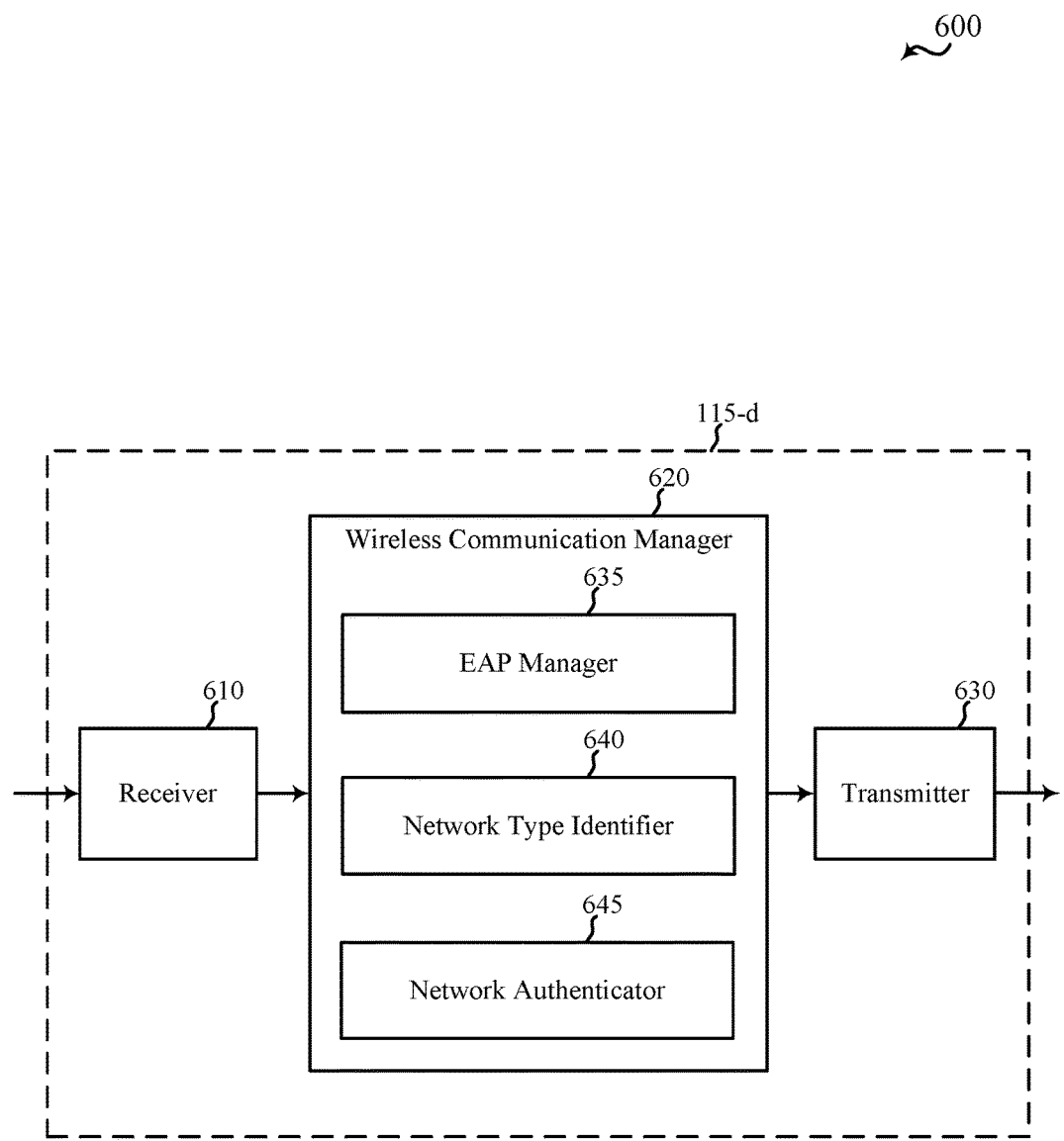
FIG. 6 shows a block diagram of a UE, in accordance with various aspects of the present disclosure.

FIG. 6 shows a block diagram 600 of a UE 115-d, in accordance with various aspects of the present disclosure. The UE 115-d may be an example of aspects of the UEs 115 described with reference to FIGS. 1, 2, 4, and 5. The UE 115-d may include a receiver 610, a wireless communication manager 620, and a transmitter 630. The UE 115-d may also include a processor. Each of these components may be in communication with each other.

The receiver 610 may receive signals or information such as reference signals, control information, or user data associated with various channels (e.g., control channels, data channels, broadcast channels, multicast channels, unicast channels, etc.). Received signals and information may be used by the receiver 610 (e.g., for frequency/time tracking) or passed to other components of the UE 115-d, including the wireless communication manager 620. The receiver 610 may be an example of aspects of the transceiver 825 described with reference to FIG. 8. The receiver 610 may include or be associated with a single antenna or a plurality of antennas.

The wireless communication manager 620 may be used to manage one or more aspects of wireless communication for the UE 115-d. In some examples, part of the wireless communication manager 620 may be incorporated into or shared with the receiver 610 or the transmitter 630. The wireless communication manager 620 may include an EAP manager 635, a network type identifier 640, and a network authenticator 645. Each of these components may communicate, directly or indirectly, with one another (e.g., via one or more buses).

The EAP manager 635 may be used to perform an EAP procedure with an authentication server via an authenticator, as described above with reference to FIG. 5. The EAP procedure may be based at least in part on a set of authentication credentials exchanged between the UE and the authentication server. The EAP manager 635 may also be used to derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof.

The network type identifier 640 may be used to determine a network type associated with the authenticator, as described above with reference to FIG. 5. In some examples, the determined network type may include a cellular network type or a non-cellular network type (e.g., a WLAN type).

The network authenticator 645 may be used to perform, based at least in part on the determined network type, at least one authentication procedure with the authenticator. The at least one authentication procedure may be based on an association of the MSK or the EMSK with the determined network type, as described above with reference to FIG. 5.

The transmitter 630 may transmit signals or information received from other components of the UE 115-d, including the wireless communication manager 620. The signals or information may include, for example, reference signals, control information, or user data associated with various channels (e.g., control channels, data channels, broadcast channels, multicast channels, unicast channels, etc.). In some examples, the transmitter 630 may be collocated with the receiver 610 in a transceiver. The transmitter 630 may be an example of aspects of the transceiver 825 described with reference to FIG. 8. The transmitter 630 may include or be associated with a single antenna or a plurality of antennas.

Figure 7:
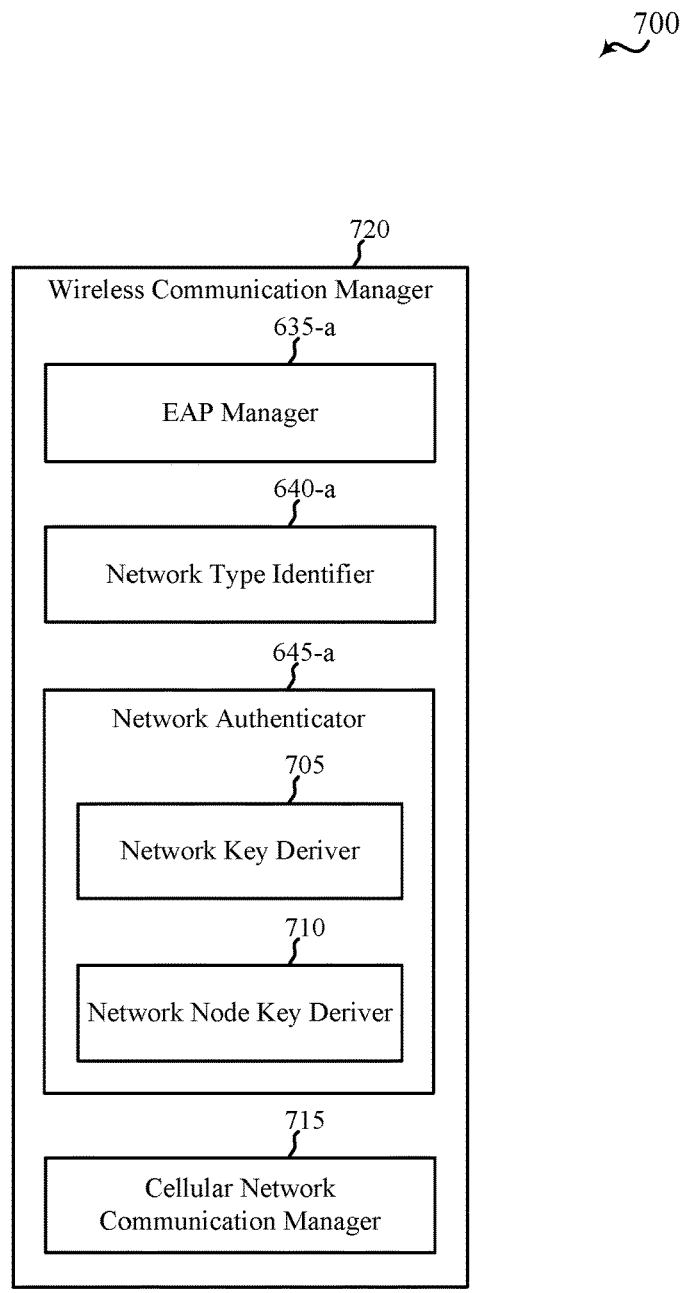
FIG. 7 shows a block diagram of a wireless communication manager, in accordance with various aspects of the present disclosure.

FIG. 7 shows a block diagram 700 of a wireless communication manager 720, in accordance with various aspects of the present disclosure. The wireless communication manager 720 may be an example of aspects of the wireless communication manager 620 described with reference to FIG. 6.

The wireless communication manager 720 may include an EAP manager 635-a, a network type identifier 640-a, a network authenticator 645-a, and a cellular network communication manager 715. The EAP manager 635-a, network type identifier 640-a, and network authenticator 645-a may be examples of the EAP manager 635, network type identifier 640, and network authenticator 645 described with reference to FIG. 6. The network authenticator 645-a may include a network key deriver 705 and a network node key deriver 710. Each of these components may communicate, directly or indirectly, with one another (e.g., via one or more buses).

The EAP manager 635-a may be used to perform an EAP procedure with an authentication server via an authenticator, as described above with reference to FIG. 5. The EAP procedure may be based at least in part on a set of authentication credentials exchanged between the UE and the authentication server. The EAP manager 635-a may also be used to derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof.

The network type identifier 640-a may be used to determine a network type associated with the authenticator, as described above with reference to FIG. 5. In some examples, the determined network type may include a cellular network type or a non-cellular network type (e.g., a WLAN type).

The network authenticator 645-a may be used to perform, based at least in part on the determined network type, at least one authentication procedure with the authenticator. The at least one authentication procedure may be based on an association of the MSK or the EMSK with the determined network type.

When the determined network type includes a cellular network type, the network key deriver 705 may be used to derive a first security key for a cellular network, as described above with reference to FIG. 5. The first security key may be based at least in part on the EMSK and a second set of parameters. In some examples, the second set of parameters may include an identifier of the cellular network, at least one cellular network-specific parameter, at least one parameter exchanged between the UE and the cellular network, or a combination thereof. When the determined network type includes a non-cellular network type, the network key deriver 705 may be used to derive a first security key for a non-cellular network.

When the determined network type includes a cellular network type, the network node key deriver 710 may be used to derive a second security key for a network node of the cellular network, as described above with reference to FIG. 5. The second security key may be based at least in part on the first security key and a third set of parameters. In some examples, the third set of parameters may include an identifier of the network node, at least one network node-specific parameter, at least one parameter exchanged between the UE and the network node, or a combination thereof.

The cellular network communication manager 715 may be used to communicate with the cellular network via the network node based at least in part on the second security key, as described above with reference to FIG. 5.

Figure 8:
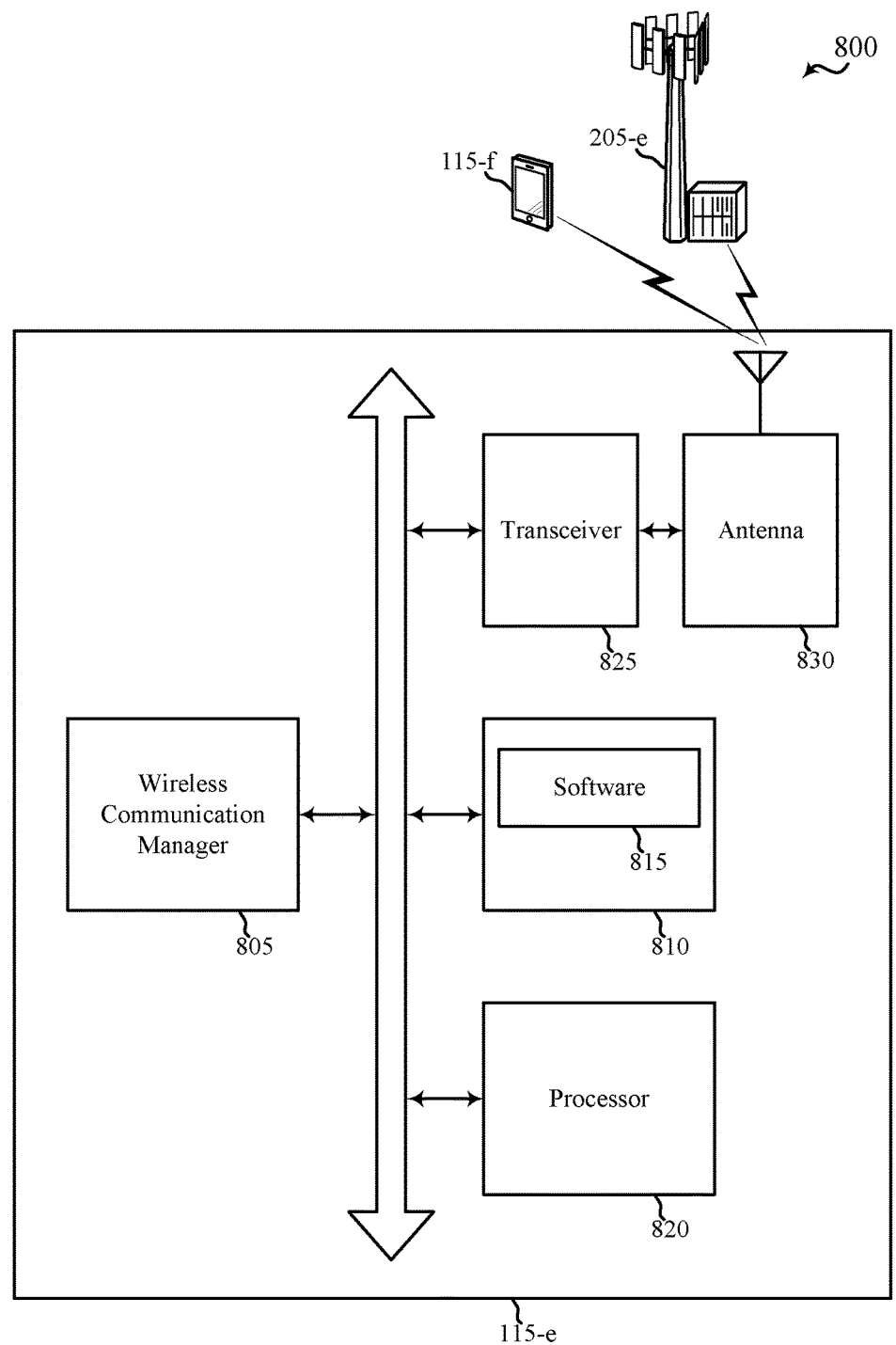
FIG. 8 shows a diagram of a wireless communication system, in accordance with various aspects of the present disclosure.

FIG. 8 shows a diagram of a wireless communication system 800, in accordance with various aspects of the present disclosure. The wireless communication system 800 may include a UE 115-e, which may be an example of aspects of the UEs 115 described with reference to FIGS. 1, 2, and 4-6.

The UE 115-e may include a wireless communication manager 805, memory 810, a processor 820, a transceiver 825, and an antenna 830. Each of these components may communicate, directly or indirectly, with one another (e.g., via one or more buses). The wireless communication manager 805 may be an example of aspects of the wireless communication managers 620 and 720 described with reference to FIGS. 6 and 7.

The memory 810 may include random access memory (RAM) or read only memory (ROM). The memory 810 may store computer-readable, computer-executable software 815 including instructions that, when executed, cause the processor 820 to perform various functions described herein, including functions related to network security and authentication. In some cases, the software 815 may not be directly executable by the processor 820 but may cause the processor 820 (e.g., when compiled and executed) to perform functions described herein. The processor 820 may include an intelligent hardware device, (e.g., a central processing unit (CPU), a microcontroller, an application specific integrated circuit (ASIC), etc.).

The transceiver 825 may communicate bi-directionally, via one or more antennas or wired links, with one or more networks, as described herein. For example, the transceiver 825 may communicate bi-directionally with a cellular network 205-*e* (or one or more nodes thereof) or another UE 115-*f*. The transceiver 825 may include a modem to modulate packets and provide the modulated packets to the antennas for transmission, and to demodulate packets received from the antennas. In some cases, the UE 115-*e* may include a single antenna 830. However, in some cases the UE 115-*e* may have more than one antenna 830, which may be capable of concurrently transmitting or receiving multiple wireless transmissions.

Figure 9:
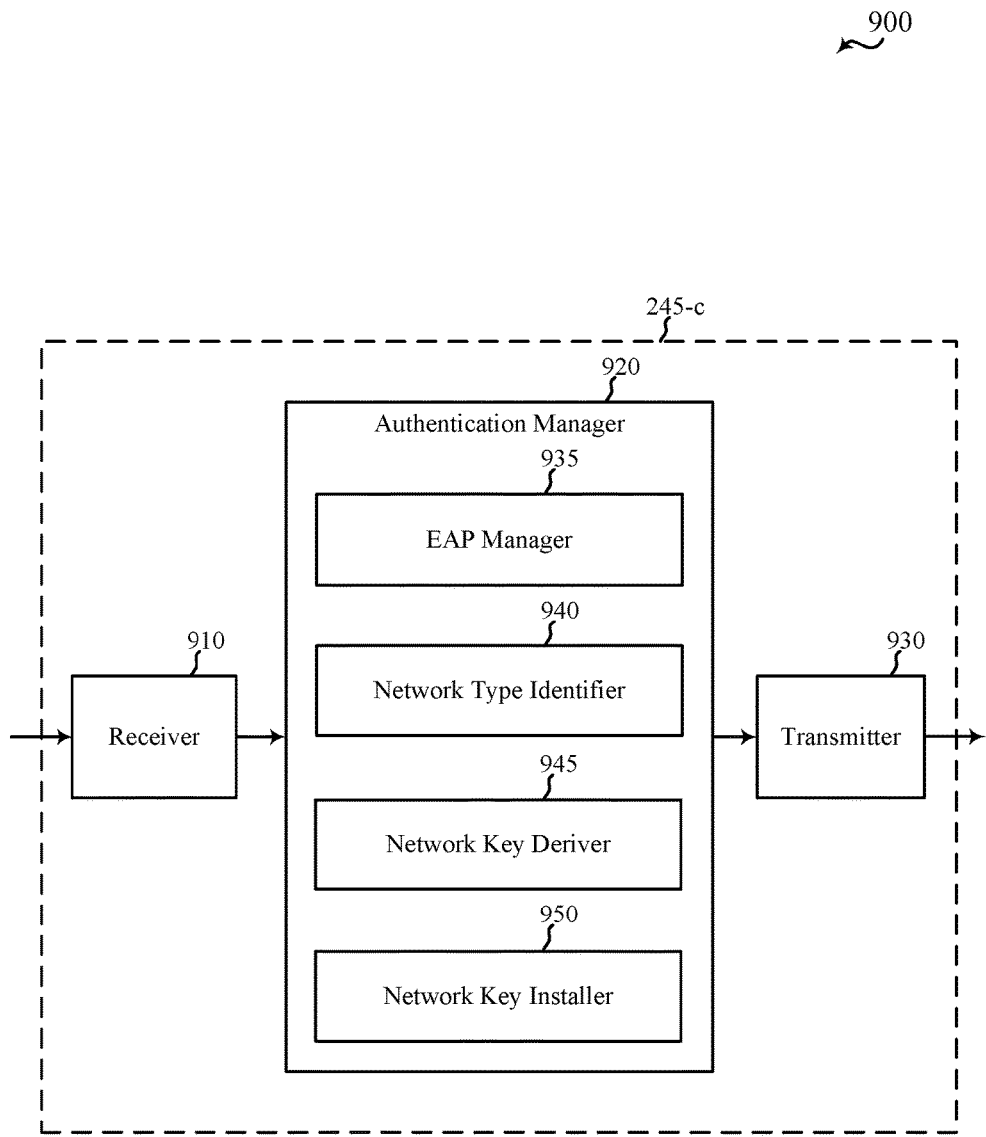
FIG. 9 shows a block diagram of an authentication server, in accordance with various aspects of the present disclosure.

FIG. 9 shows a block diagram 900 of an authentication server 245-*c*, in accordance with various aspects of the present disclosure. The authentication server 245-*c* may be an example of aspects of the authentication servers 245 described with reference to FIGS. 2, 4, and 5. The authentication server 245-*c* may include a receiver 910, an authentication manager 920, and a transmitter 930. The authentication server 245-*c* may also include a processor. Each of these components may be in communication with each other.

The receiver 910 may receive authentication requests from various network nodes, including nodes of a cellular network, a WLAN, etc. The receiver 910 may also receive authentication information from UEs via the network nodes. Received authentication requests and authentication information may be passed to the authentication manager 920. The receiver 910 may be an example of aspects of the authentication interface 1025 described with reference to FIG. 10. The receiver 910 may include one or more wired and/or wireless interfaces.

The authentication manager 920 may be used to manage one or more aspects of device authentication for the authentication server 245-*c*. In some examples, part of the authentication manager 920 may be incorporated into or shared with the receiver 910 or the transmitter 930. The authentication manager 920 may include an EAP manager 935, a network type identifier 940, a network key deriver 945, and a network key installer 950. Each of these components may communicate, directly or indirectly, with one another (e.g., via one or more buses).

The EAP manager 935 may be used to perform an EAP procedure with a UE via an authenticator, as described above with reference to FIG. 5. The EAP procedure may be based at least in part on a set of authentication credentials exchanged between the authentication server and the UE. The EAP manager 935 may also be used to derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof.

The network type identifier 940 may be used to determine a network type associated with the authenticator, as described above with reference to FIG. 5. In some examples, the determined network type may include a cellular network type or a non-cellular network type (e.g., a WLAN type).

The network key deriver 945 may be used to derive a security key for the determined network type based at least in part on an association of the MSK or the EMSK with the network type, and based at least in part on a second set of parameters, as described above with reference to FIG. 5. When the determined network type includes a cellular network type, and in some examples, the second set of parameters may include an identifier of a cellular network, at least one cellular network-specific parameter, at least one parameter exchanged between the authentication server and the cellular network, or a combination thereof. In some examples, the cellular network may include at least one of a 5G network, a 4G network, a LTE network, a LTE-A network, a 3G network, or a combination thereof.

The network key installer 950 may be used to transmit the security key to the authenticator via a secure channel, as described above with reference to FIG. 5.

The transmitter 930 may transmit authentication feedback messages and security keys received from other components of the authentication server 245-*c*, including the authentication manager 920. The transmitter 930 may be an example of aspects of the authentication interface 1025 described with reference to FIG. 10. The transmitter 930 may include one or more wired and/or wireless interfaces.

Figure 10:
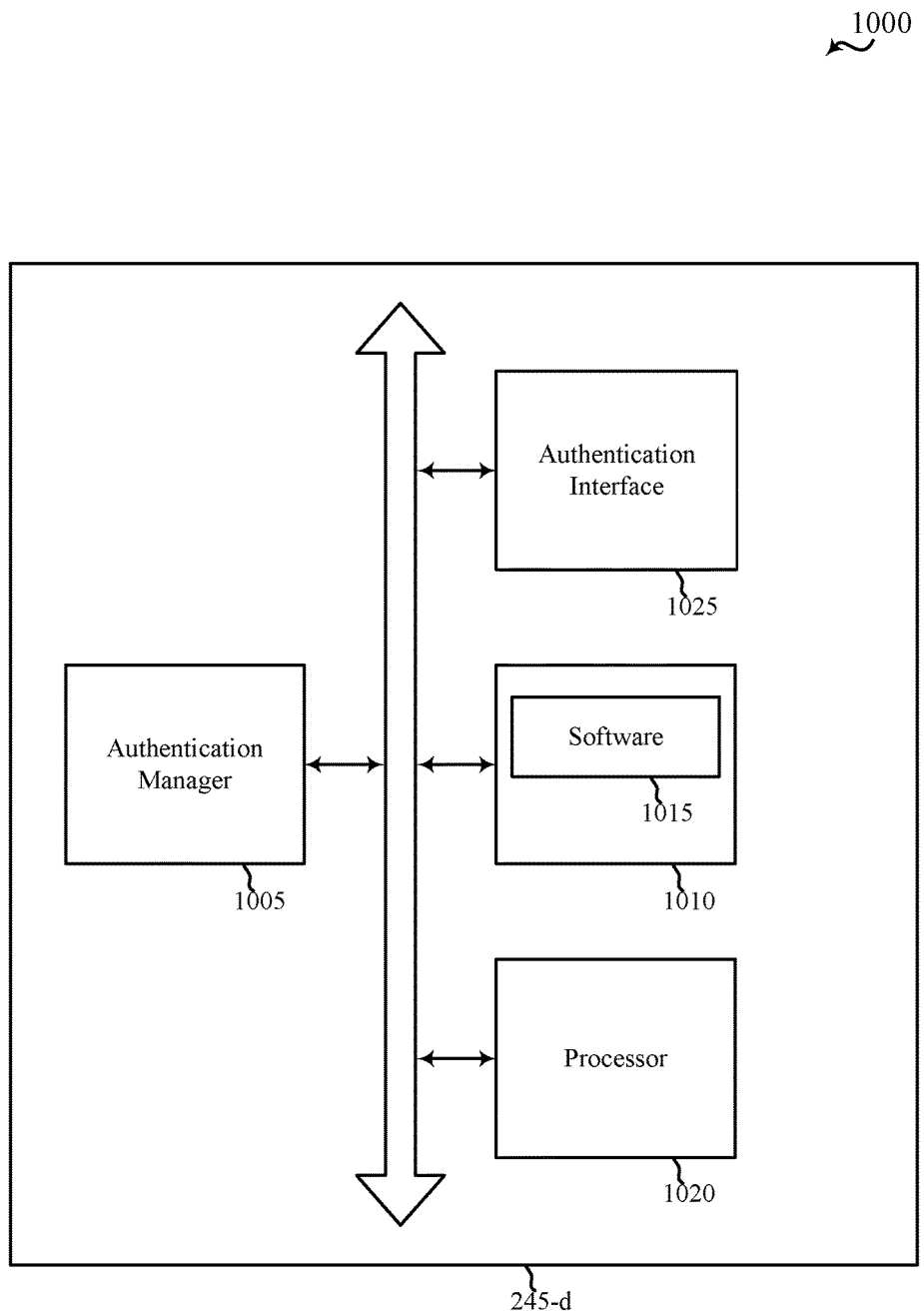
FIG. 10 shows a block diagram of an authentication server, in accordance with various aspects of the present disclosure.

FIG. 10 shows a block diagram 1000 of an authentication server 245-*d*, in accordance with various aspects of the present disclosure. The authentication server 245-*d* may be an example of aspects of the authentication servers 245 described with reference to FIGS. 2, 4, 5, and 9.

The authentication server 245-*d* may include an authentication manager 1005, memory 1010, a processor 1020, and an authentication interface 1025. Each of these components may communicate, directly or indirectly, with one another (e.g., via one or more buses). The authentication manager 1005 may be an example of aspects of the authentication manager 920 described with reference to FIG. 9.

The memory 1010 may include RAM or ROM. The memory 1010 may store computer-readable, computer-executable software 1015 including instructions that, when executed, cause the processor 1020 to perform various functions described herein, including functions related to network security and authentication. In some cases, the software 1015 may not be directly executable by the processor 1020 but may cause the processor 1020 (e.g., when compiled and executed) to perform functions described herein. The processor 1020 may include an intelligent hardware device, (e.g., a CPU, a microcontroller, an ASIC, etc.).

The authentication interface 1025 may communicate bi-directionally, via one or more antennas or wired links, with one or more networks, network nodes, or UEs, as described herein. In some examples, the authentication interface 1025 may be used to establish a secure connection with a network node (e.g., using a Radius or Diameter protocol) and communicate bi-directionally with a UE via the secure connection and network node.

Figure 11:
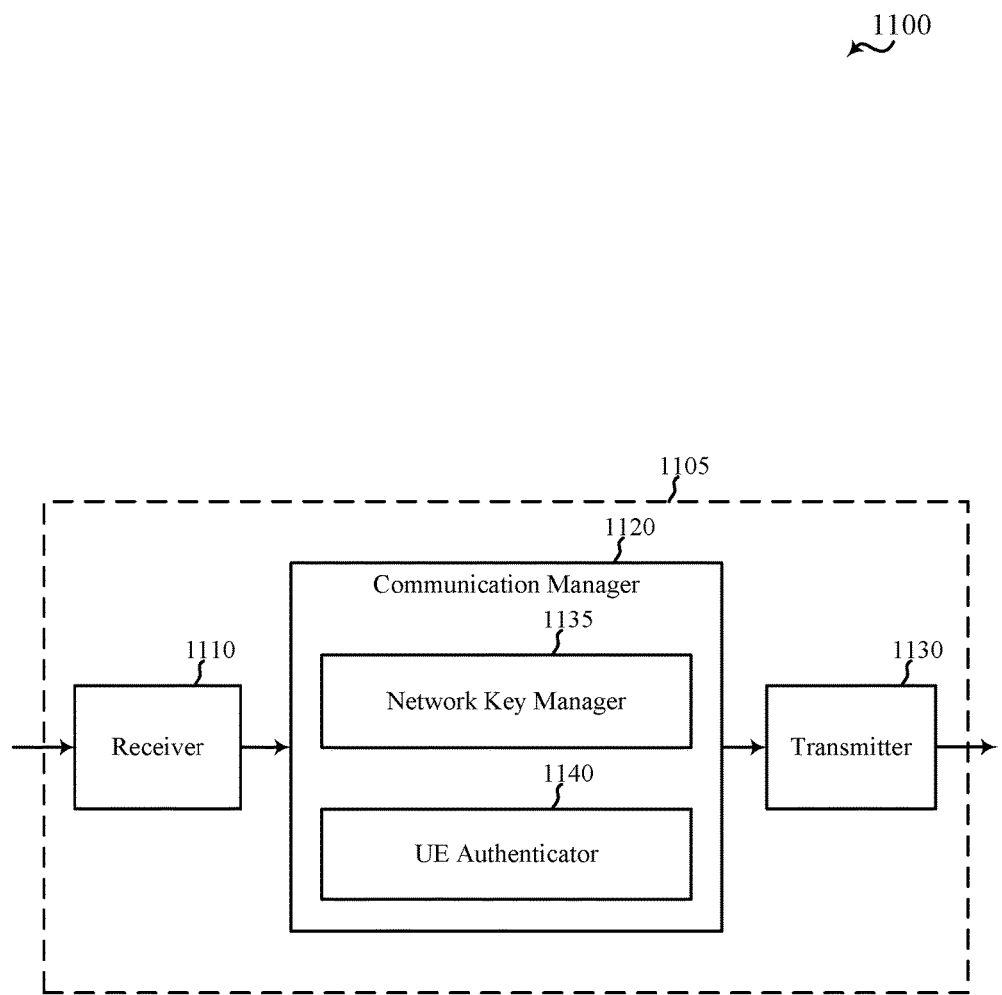
FIG. 11 shows a block diagram of a network node, in accordance with various aspects of the present disclosure.

FIG. 11 shows a block diagram 1100 of a network node 1105, in accordance with various aspects of the present disclosure. The network node 1105 may be an example of aspects of the network nodes described with reference to FIGS. 2, 4, and 5, and in some examples may be an example of the authenticators 235 described with reference to FIGS. 2, 4, and 5. The network node 1105 may include a receiver 1110, a communication manager 1120, and a transmitter 1130. The network node 1105 may also include a processor. Each of these components may be in communication with each other.

The receiver 1110 may receive signals or information from other network nodes, from UEs, from an authentication server, etc. Received signals and information may be passed to other components of the network node 1105, including the communication manager 1120. The receiver 1110 may be an example of aspects of the authentication interface 1325 described with reference to FIG. 13. The receiver 1110 may include one or more wired and/or wireless interfaces.

The communication manager 1120 may be used to manage one or more aspects of wireless communication for the network node 1105. In some examples, part of the communication manager 1120 may be incorporated into or shared with the receiver 1110 or the transmitter 1130. The communication manager 1120 may include a network key manager 1135 and a UE authenticator 1140. Each of these components may communicate, directly or indirectly, with one another (e.g., via one or more buses).

The network key manager 1135 may be used to receive, from an authentication server, a first security key based at least in part on an EMSK and a first set of parameters, as described above with reference to FIG. 5. The EMSK may be based at least in part on a set of authentication credentials and a second set of parameters. The authentication credentials may be exchanged between a UE and the authentication server during an EAP procedure. In some examples, the first set of parameters may include an identifier of the cellular network, at least one cellular network-specific parameter, at least one parameter exchanged between the UE and the cellular network, or a combination thereof. In some examples, the second set of parameters may include at least one identifier, at least one random number, at least one network parameter, at least one UE parameter, or a combination thereof. In some examples, the cellular network may include at least one of a 5G network, a 4G network, a LTE network, a LTE-A network, a 3G network, or a combination thereof.

The UE authenticator 1140 may be used to perform at least one authentication procedure with the UE based at least in part on the first security key, as described above with reference to FIG. 5.

The transmitter 1130 may transmit signals or information received from other components of the network node 1105, including the communication manager 1120. The transmitter 1130 may be an example of aspects of the authentication interface 1325 described with reference to FIG. 13. The receiver 1110 may include one or more wired and/or wireless interfaces.

Figure 12:
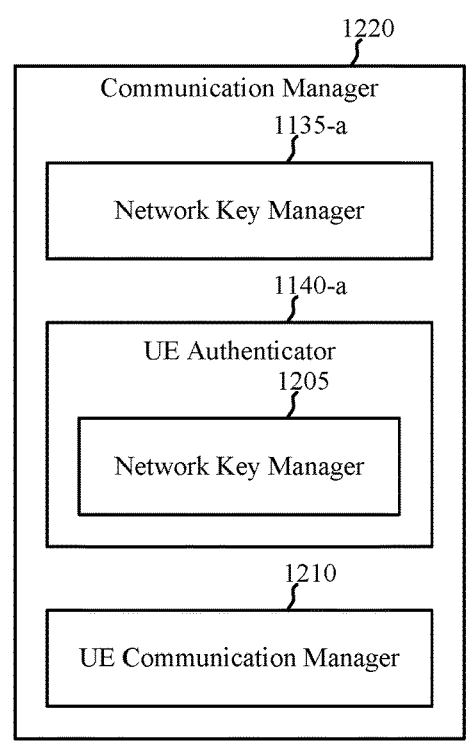
FIG. 12 shows a block diagram of a communication manager, in accordance with various aspects of the present disclosure

FIG. 12 shows a block diagram 1200 of a communication manager 1220, in accordance with various aspects of the present disclosure. The communication manager 1220 may be an example of aspects of the communication manager 1120 described with reference to FIG. 11.

The communication manager 1220 may include a network key manager 1135-*a*, a UE authenticator 1140-*a*, and a UE communication manager 1210. The network key manager 1135-*a* and UE authenticator 1140-*a* may be examples of the network key manager 1135 and UE authenticator 1140 described with reference to FIG. 11. The UE authenticator 1140-*a* may include a network node key deriver 1205. Each of these components may communicate, directly or indirectly, with one another (e.g., via one or more buses).

The network key manager 1135-*a* may be used to receive, from an authentication server, a first security key based at least in part on an EMSK and a first set of parameters, as described above with reference to FIG. 5. The EMSK may be based at least in part on a set of authentication credentials and a second set of parameters. The authentication credentials may be exchanged between a UE and the authentication server during an EAP procedure. In some examples, the first set of parameters may include an identifier of the cellular network, at least one cellular network-specific parameter, at least one parameter exchanged between the UE and the cellular network, or a combination thereof. In some examples, the second set of parameters may include at least one identifier, at least one random number, at least one network parameter, at least one UE parameter, or a combination thereof. In some examples, the cellular network may include at least one of a 5G network, a 4G network, a LTE network, a LTE-A network, a 3G network, or a combination thereof.

The UE authenticator 1140-*a* may be used to perform at least one authentication procedure with the UE based at least in part on the first security key, as described above with reference to FIG. 5. The network node key deriver 1205 may be used to perform the at least one authentication procedure with the UE may include deriving a second security key for a network node of the cellular network. The second security key may be based at least in part on the first security key and a third set of parameters. In some examples, the third set of parameters may include an identifier of the network node, at least one network node-specific parameter, at least one parameter exchanged between the UE and the network node, or a combination thereof.

The UE communication manager 1210 may be used to communicate with the UE via the network node based at least in part on the second security key, as described above with reference to FIG. 5.

Figure 13:
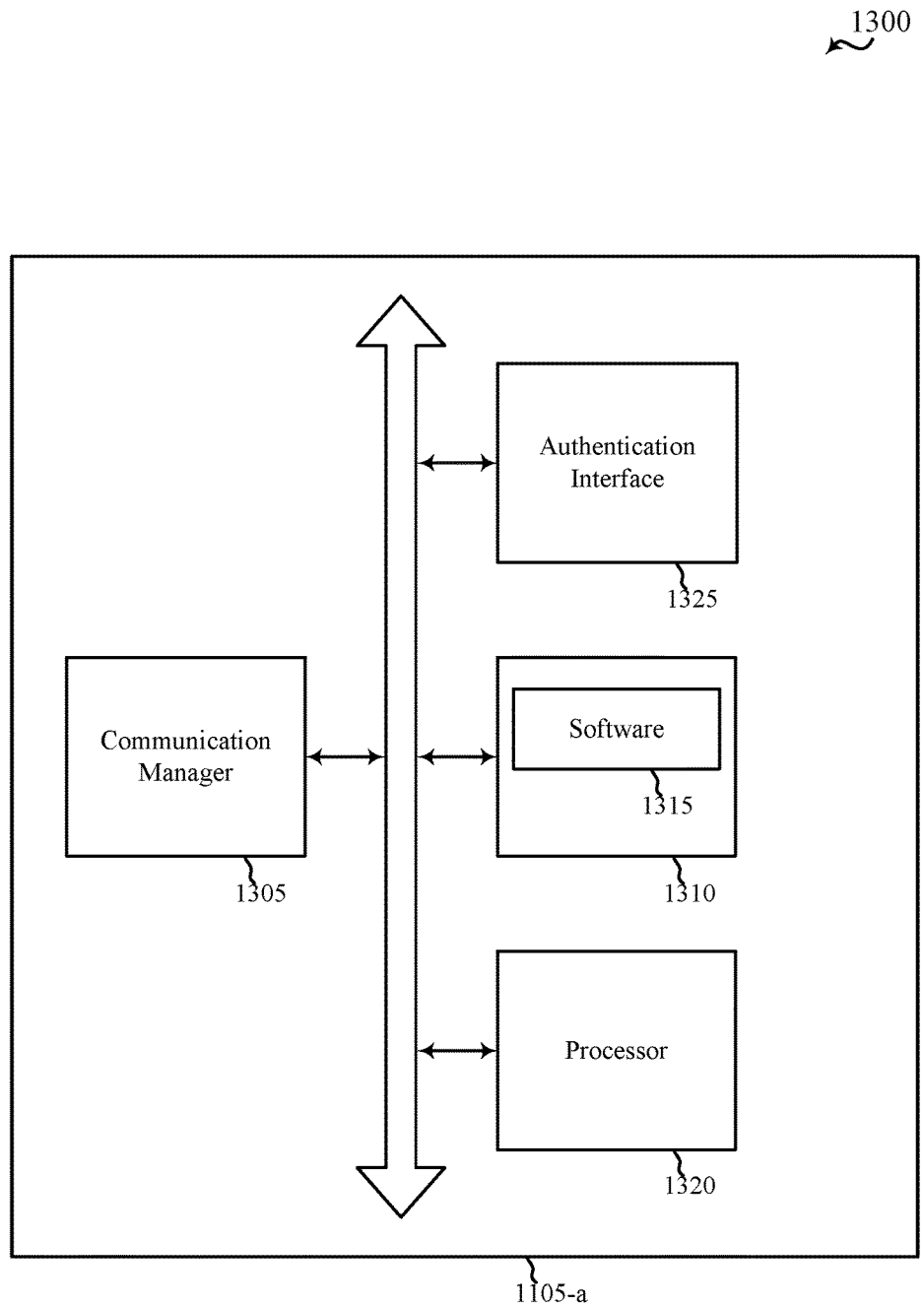
FIG. 13 shows a diagram of a network node, in accordance with various aspects of the present disclosure.

FIG. 13 shows a diagram 1300 of a network node 1105-*a*, in accordance with various aspects of the present disclosure. The network node 1105-*a* may be an example of aspects of the network nodes described with reference to FIGS. 2, 4, 5, and 11.

The network node 1105-*a* may include a communication manager 1305, memory 1310, a processor 1320, and an authentication interface 1325. Each of these components may communicate, directly or indirectly, with one another (e.g., via one or more buses). The communication manager 1305 may be an example of aspects of the communication managers described with reference to FIG. 11 or 12.

The memory 1310 may include RAM or ROM. The memory 1310 may store computer-readable, computer-executable software 1315 including instructions that, when executed, cause the processor 1320 to perform various functions described herein, including functions related to network security and authentication. In some cases, the software 1315 may not be directly executable by the processor 1320 but may cause the processor 1320 (e.g., when compiled and executed) to perform functions described herein. The processor 1320 may include an intelligent hardware device, (e.g., a CPU, a microcontroller, an ASIC, etc.).

The authentication interface 1325 may communicate bi-directionally, via one or more antennas or wired links, with one or more networks, network nodes, or UEs, as described herein. In some examples, the authentication interface 1325 may be used to establish a secure connection with an authentication server (e.g., using a Radius or Diameter protocol) and facilitate an EAP procedure performed by a UE and the authentication server.

Figure 14:
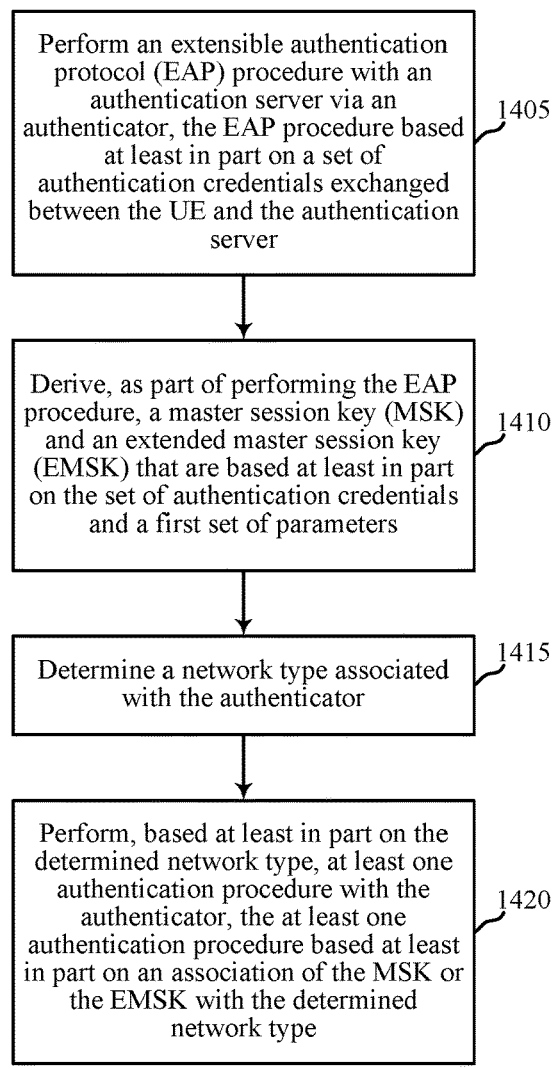
FIGS. 14-18 show flowcharts illustrating methods for wireless communication, in accordance with various aspects of the present disclosure.

FIG. 14 shows a flowchart illustrating a method 1400 for wireless communication, in accordance with various aspects of the present disclosure. The operations of method 1400 may be performed by a UE 115 or its components, as described with reference to FIGS. 1-8. In some examples, the operations of method 1400 may be performed by the wireless communication manager described with reference to FIGS. 6-8. In some examples, a UE may execute a set of codes to control the functional elements of the UE to perform the functions described below. Additionally or alternatively, a UE may perform aspects of the functions described below using special-purpose hardware.

At block 1405, a UE may perform an EAP procedure with an authentication server via an authenticator, as described above with reference to FIG. 5. The EAP procedure may be based at least in part on a set of authentication credentials exchanged between the UE and the authentication server. In certain examples, the operations of block 1405 may be performed using the EAP manager 635 described with reference to FIGS. 6 and 7.

At block 1410, the UE may derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof. In certain examples, the operations of block 1410 may be performed using the EAP manager 635 described with reference to FIGS. 6 and 7.

At block 1415, the UE may determine a network type associated with the authenticator, as described above with reference to FIG. 5. In some examples, the determined network type may include a cellular network type or a non-cellular network type (e.g., a WLAN type). In certain examples, the operations of block 1415 may be performed using the network type identifier 640 described with reference to FIGS. 6 and 7.

At block 1420, the UE may perform, based at least in part on the determined network type, at least one authentication procedure with the authenticator. The at least one authentication procedure may be based at least in part on an association of the MSK or the EMSK with the determined network type, as described above with reference to FIG. 5. In certain examples, the operations of block 1420 may be performed using the network authenticator 645 described with reference to FIGS. 6 and 7.

Figure 15:
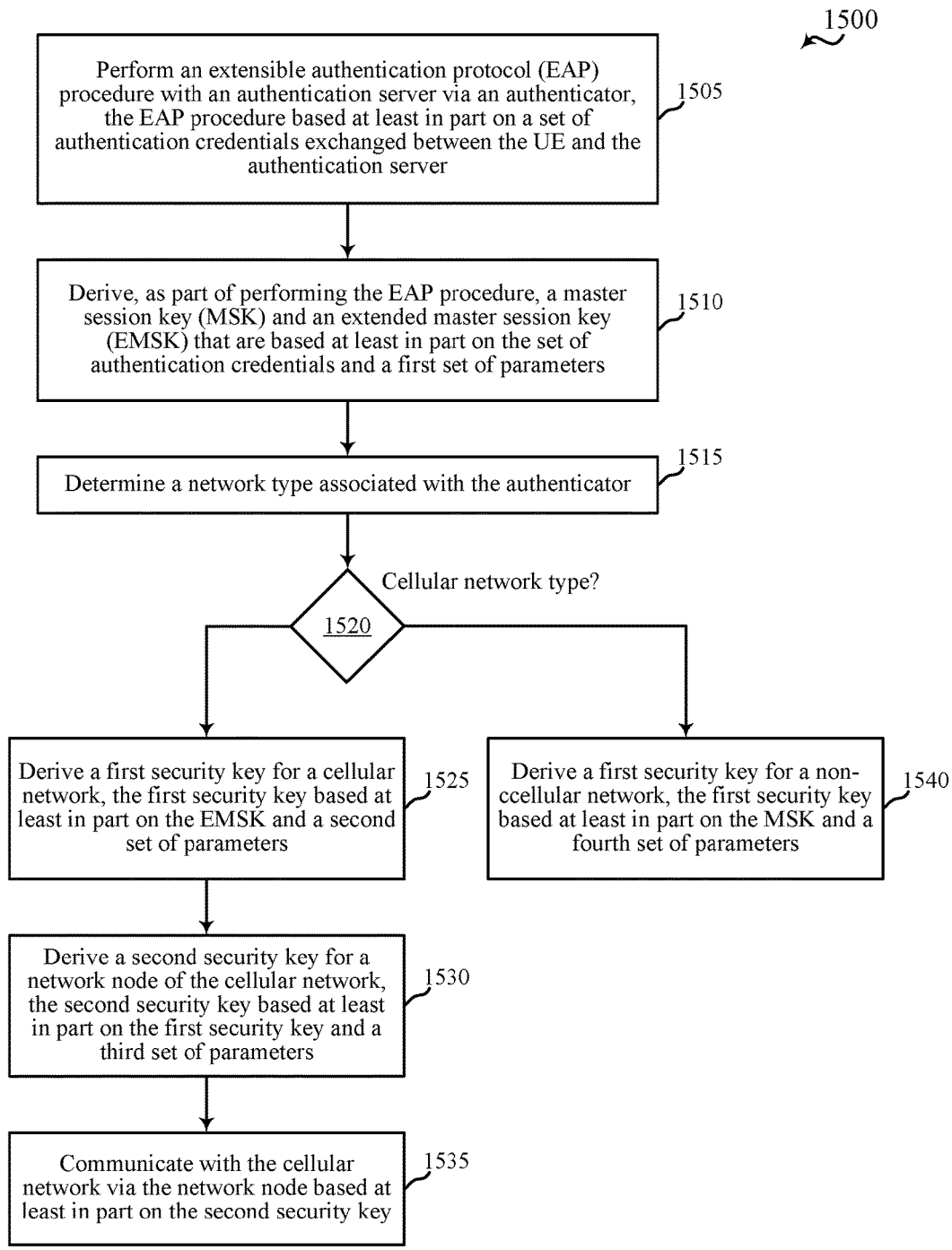

FIG. 15 shows a flowchart illustrating a method 1500 for wireless communication, in accordance with various aspects of the present disclosure. The operations of method 1500 may be performed by a UE 115 or its components, as described with reference to FIGS. 1-8. In some examples, the operations of method 1500 may be performed by the wireless communication manager described with reference to FIGS. 6-8. In some examples, a UE may execute a set of codes to control the functional elements of the UE to perform the functions described below. Additionally or alternatively, a UE may perform aspects of the functions described below using special-purpose hardware.

At block 1505, a UE may perform an EAP procedure with an authentication server via an authenticator, as described above with reference to FIG. 5. The EAP procedure may be based at least in part on a set of authentication credentials exchanged between the UE and the authentication server. In certain examples, the operations of block 1505 may be performed using the EAP manager 635 described with reference to FIGS. 6 and 7.

At block 1510, the UE may derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof. In certain examples, the operations of block 1510 may be performed using the EAP manager 635 described with reference to FIGS. 6 and 7.

At block 1515, the UE may determine a network type associated with the authenticator, as described above with reference to FIG. 5. In some examples, the determined network type may include a cellular network type or a non-cellular network type (e.g., a WLAN type). In certain examples, the operations of block 1515 may be performed using the network type identifier 640 described with reference to FIGS. 6 and 7.

At block 1520, the method 1500 may branch to block 1525 or 1540, depending on whether the determined network type includes a cellular network type or a non-cellular network type. When the determined network type includes a cellular network type, the method 1500 may branch to block 1525. When the determined network type includes a non-cellular network type, the method 1500 may branch to block 1540. In certain examples, the operations of block 1520 may be performed using the network type identifier 640 described with reference to FIGS. 6 and 7. In some examples, the cellular network may include at least one of a 5G network, a 4G network, a LTE network, a LTE-A network, a 3G network, or a combination thereof.

If the UE determines that the network type includes a cellular network type, at blocks 1525 and 1530, the UE may perform, based at least in part on the determined network type, at least one authentication procedure with the authenticator. The at least one authentication procedure may be based on an association of the MSK or the EMSK with the determined network type. At block 1525, the UE may derive a first security key for a cellular network, as described above with reference to FIG. 5. The first security key may be based at least in part on the EMSK and a second set of parameters. In some examples, the second set of parameters may include an identifier of the cellular network, at least one cellular network-specific parameter, at least one parameter exchanged between the UE and the cellular network, or a combination thereof. In certain examples, the operations of block 1525 may be performed using the network authenticator 645 described with reference to FIGS. 6 and 7, or the network key deriver 705 described with reference to FIG. 7.

At block 1530, the UE may derive a second security key for a network node of the cellular network, as described above with reference to FIG. 5. The second security key may be based at least in part on the first security key and a third set of parameters. In some examples, the third set of parameters may include an identifier of the network node, at least one network node-specific parameter, at least one parameter exchanged between the UE and the network node, or a combination thereof. In certain examples, the operations of block 1530 may be performed using the network authenticator 645 described with reference to FIGS. 6 and 7, or the network node key deriver 710 described with reference to FIG. 7.

At block 1535, the UE may communicate with the cellular network via the network node based at least in part on the second security key, as described above with reference to FIG. 5. In certain examples, the operations of block 1530 may be performed using the cellular network communication manager 715 described with reference to FIG. 7.

If the UE determines that the network type includes a non-cellular network type, at block 1540, the UE may derive a first security key for a non-cellular network. The first security key may be based at least in part on the MSK and a fourth set of parameters. In certain examples, the operations of block 1540 may be performed using the network authenticator 645 described with reference to FIGS. 6 and 7, or the network key deriver 705 described with reference to FIG. 7.

Figure 16:
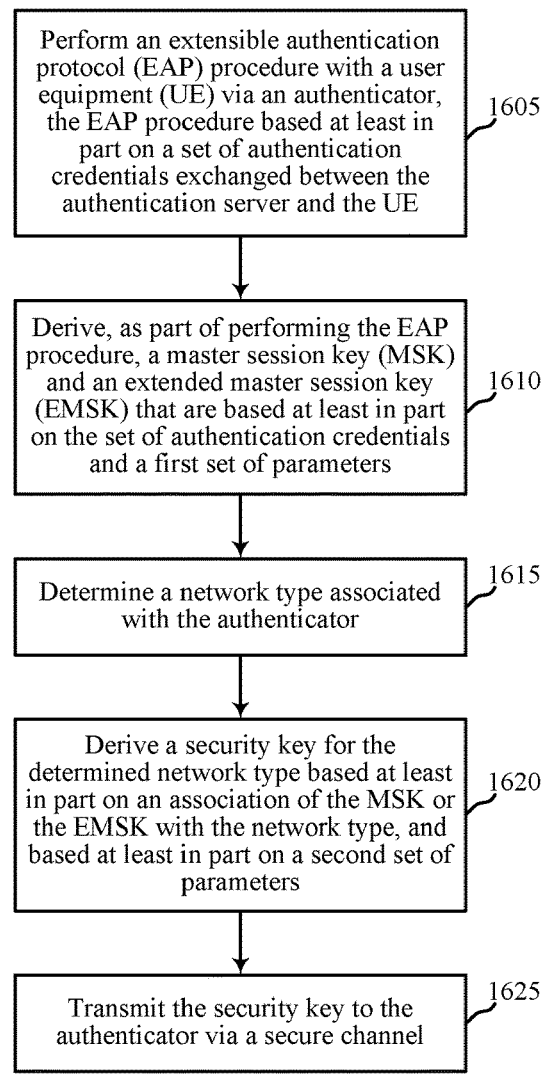

FIG. 16 shows a flowchart illustrating a method 1600 for wireless communication, in accordance with various aspects of the present disclosure. The operations of method 1600 may be performed by an authentication server or its components, as described with reference to FIGS. 1-5, 9, and 10. In some examples, the operations of method 1600 may be performed by the authentication manager described with reference to FIGS. 9 and 10. In some examples, an authentication server may execute a set of codes to control the functional elements of the authentication server to perform the functions described below. Additionally or alternatively, an authentication server may perform aspects of the functions described below using special-purpose hardware.

At block 1605, an authentication server may perform an EAP procedure with a UE via an authenticator, as described above with reference to FIG. 5. The EAP procedure may be based at least in part on a set of authentication credentials exchanged between the authentication server and the UE. In certain examples, the operations of block 1605 may be performed using the EAP manager 935 described with reference to FIG. 9.

At block 1610, the authentication server may derive, as part of performing the EAP procedure, an MSK and an EMSK that are based at least in part on the authentication credentials and a first set of parameters, as described above with reference to FIG. 5. In some examples, the first set of parameters may include at least one identifier, at least one random number, at least one network parameter, at least one UE parameter, or a combination thereof. In certain examples, the operations of block 1610 may be performed using the EAP manager 935 described with reference to FIG. 9.

At block 1615, the authentication server may determine a network type associated with the authenticator, as described above with reference to FIG. 5. In some examples, the determined network type may include a cellular network type or a non-cellular network type (e.g., a WLAN type). In certain examples, the operations of block 1615 may be performed using the network type identifier 940 described with reference to FIG. 9.

At block 1620, the authentication server may derive a security key for the determined network type based at least in part on an association of the MSK or the EMSK with the network type, and based at least in part on a second set of parameters, as described above with reference to FIG. 5. When the determined network type includes a cellular network type, and in some examples, the second set of parameters may include an identifier of a cellular network, at least one cellular network-specific parameter, at least one parameter exchanged between the authentication server and the cellular network, or a combination thereof. In some examples, the cellular network may include at least one of a 5G network, a 4G network, a LTE network, a LTE-A network, a 3G network, or a combination thereof. In certain examples, the operations of block 1620 may be performed using the network key deriver 945 described with reference to FIG. 9.

At block 1625, the authentication server may transmit the security key to the authenticator via a secure channel, as described above with reference to FIG. 5. In certain examples, the operations of block 1625 may be performed using the network key installer 950 described with reference to FIG. 9.

Figure 17:
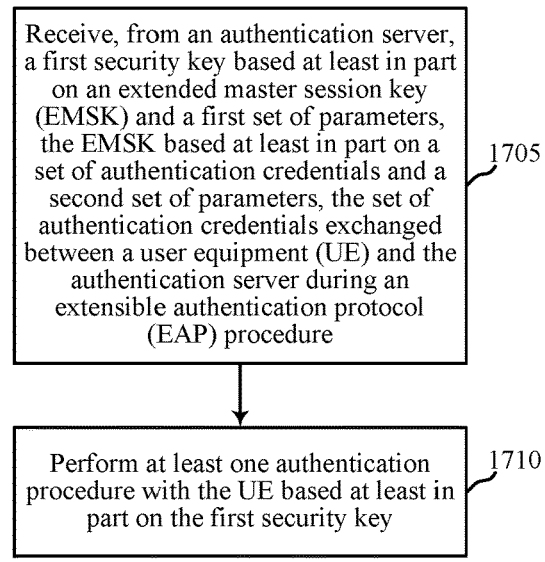

FIG. 17 shows a flowchart illustrating a method 1700 for wireless communication, in accordance with various aspects of the present disclosure. The operations of method 1700 may be performed by a cellular network or its components, as described with reference to FIGS. 1-5 and 11-13. In some examples, the operations of method 1700 may be performed by the communication manager described with reference to FIGS. 11-13. In some examples, a cellular network (or one or more nodes thereof) may execute a set of codes to control the functional elements of the cellular network to perform the functions described below. Additionally or alternatively, a cellular network (or one or more nodes thereof) may perform aspects of the functions described below using special-purpose hardware.

At block 1705, a cellular network may receive, from an authentication server, a first security key based at least in part on an EMSK and a first set of parameters, as described above with reference to FIG. 5. The EMSK may be based at least in part on a set of authentication credentials and a second set of parameters. The authentication credentials may be exchanged between a UE and the authentication server during an EAP procedure. In some examples, the first set of parameters may include an identifier of the cellular network, at least one cellular network-specific parameter, at least one parameter exchanged between the UE and the cellular network, or a combination thereof. In some examples, the second set of parameters may include at least one identifier, at least one random number, at least one network parameter, at least one UE parameter, or a combination thereof. In some examples, the cellular network may include at least one of a 5G network, a 4G network, a LTE network, a LTE-A network, a 3G network, or a combination thereof. In certain examples, the operations of block 1705 may be performed using the network key manager 1135 described with reference to FIG. 11.

At block 1710, the cellular network may perform at least one authentication procedure with the UE based at least in part on the first security key, as described above with reference to FIG. 5. In certain examples, the operations of block 1710 may be performed using the UE authenticator 1140 described with reference to FIG. 11.

Figure 18:
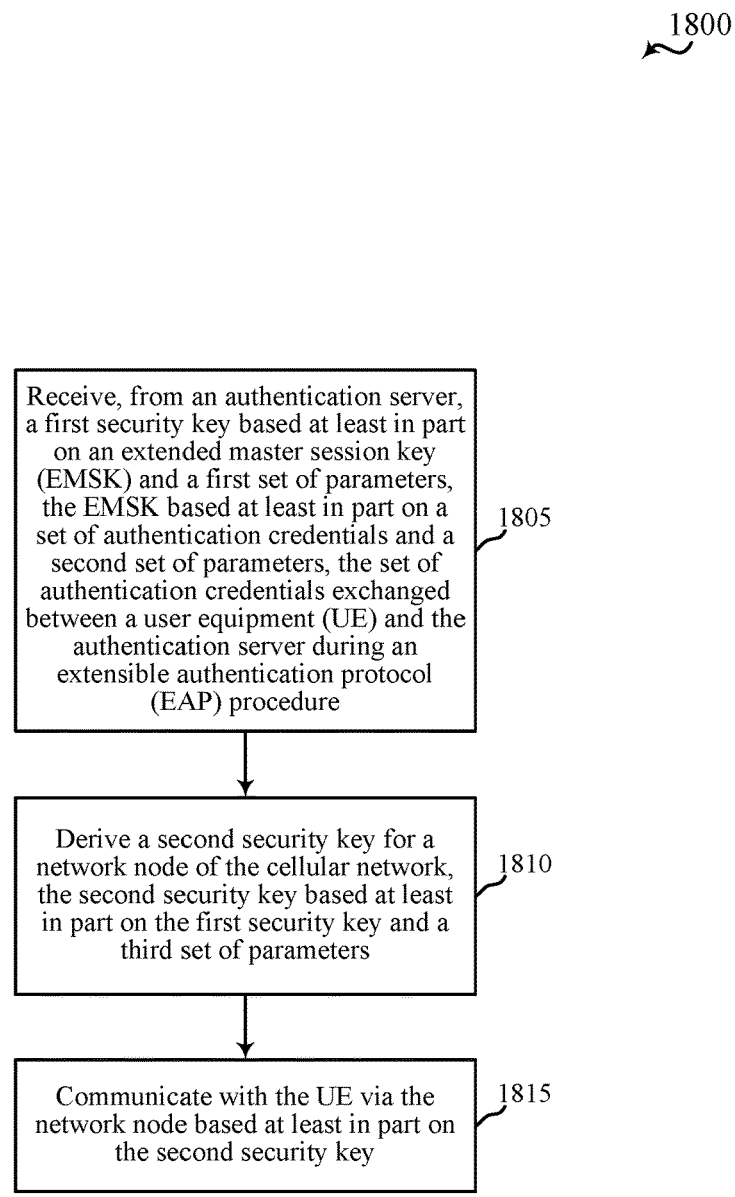

FIG. 18 shows a flowchart illustrating a method 1800 for wireless communication, in accordance with various aspects of the present disclosure. The operations of method 1800 may be performed by a cellular network or its components, as described with reference to FIGS. 1-5 and 11-13. In some examples, the operations of method 1800 may be performed by the communication manager described with reference to FIGS. 11-13. In some examples, a cellular network (or one or more nodes thereof) may execute a set of codes to control the functional elements of the cellular network to perform the functions described below. Additionally or alternatively, a cellular network (or one or more nodes thereof) may perform aspects of the functions described below using special-purpose hardware.

At block 1805, a cellular network may receive, from an authentication server, a first security key based at least in part on an EMSK and a first set of parameters, as described above with reference to FIG. 5. The EMSK may be based at least in part on a set of authentication credentials and a second set of parameters. The authentication credentials may be exchanged between a UE and the authentication server during an EAP procedure. In some examples, the first set of parameters may include an identifier of the cellular network, at least one cellular network-specific parameter, at least one parameter exchanged between the UE and the cellular network, or a combination thereof. In some examples, the second set of parameters may include at least one identifier, at least one random number, at least one network parameter, at least one UE parameter, or a combination thereof. In some examples, the cellular network may include at least one of a 5G network, a 4G network, a LTE network, a LTE-A network, a 3G network, or a combination thereof. In certain examples, the operations of block 1805 may be performed using the network key manager 1135 described with reference to FIG. 11.

At block 1810, the cellular network may perform at least one authentication procedure with the UE based at least in part on the first security key. Performing the at least one authentication procedure with the UE may include deriving a second security key for a network node of the cellular network, as described above with reference to FIG. 5. The second security key may be based at least in part on the first security key and a third set of parameters. In some examples, the third set of parameters may include an identifier of the network node, at least one network node-specific parameter, at least one parameter exchanged between the UE and the network node, or a combination thereof. In certain examples, the operations of block 1810 may be performed using the UE authenticator 1140 described with reference to FIG. 11, or the network node key deriver 1205 described with reference to FIG. 12.

At block 1815, the cellular network may communicate with the UE via the network node based at least in part on the second security key, as described above with reference to FIG. 5. In certain examples, the operations of block 1815 may be performed using the UE communication manager 1210 described with reference to FIG. 12.

It should be noted that the methods described above illustrate possible implementations of the techniques described in the present disclosure. In some examples, the operations of the methods may be performed in different orders or include different operations.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   performing an extensible authentication protocol (EAP) procedure with an authentication server via an authenticator, the EAP procedure based at least in part on a set of authentication credentials exchanged between the UE and the authentication server;
   deriving, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;
   determining a network type associated with the authenticator; and
   performing, based at least in part on the determined network type, at least one authentication procedure with the authenticator, the at least one authentication procedure based on an association of the MSK or the EMSK with the determined network type.

2. The method of claim 1, wherein the determined network type comprises a cellular network type and performing the at least one authentication procedure with the authenticator comprises:
   deriving a first security key for a cellular network, the first security key based at least in part on the EMSK and a second set of parameters.

3. The method of claim 2, wherein the second set of parameters comprises:
   an identifier of the cellular network, at least one cellular network-specific parameter, at least one parameter exchanged between the UE and the cellular network, or a combination thereof.

4. The method of claim 2, wherein performing the at least one authentication procedure with the authenticator comprises:
   deriving a second security key for a network node of the cellular network, the second security key based at least in part on the first security key and a third set of parameters; and
   communicating with the cellular network via the network node based at least in part on the second security key.

5. The method of claim 4, wherein the third set of parameters comprises:
   an identifier of the network node, at least one network node-specific parameter, at least one parameter exchanged between the UE and the network node, or a combination thereof.

6. The method of claim 2, wherein the cellular network comprises at least one of:
   a fifth generation (5G) network, a fourth generation (4G) network, a Long Term Evolution (LTE) network, a LTE-Advanced (LTE-A) network, a third generation (3G) network, or a combination thereof.

7. The method of claim 1, wherein the determined network type is a non-cellular network type and performing the at least one authentication procedure with the authenticator comprises:
   deriving a first security key for a non-cellular network, the first security key based at least in part on the MSK and a second set of parameters.

8. An apparatus for wireless communication at a user equipment (UE), comprising:
   means for performing an extensible authentication protocol (EAP) procedure with an authentication server via an authenticator, the EAP procedure based at least in part on a set of authentication credentials exchanged between the UE and the authentication server;
   means for deriving, as part of performing the EAP procedure, a master session key (MSK) and an extended master session key (EMSK) that are based at least in part on the authentication credentials and a first set of parameters wherein the first set of parameters comprises: at least one identifier, at least one random number, at least one network parameter, at least one UE parameter, or a combination thereof;
   means for determining a network type associated with the authenticator; and
   means for performing, based at least in part on the determined network type, at least one authentication procedure with the authenticator, the at least one authentication procedure based on an association of the MSK or the EMSK with the determined network type.

9. An apparatus for wireless communication at a user equipment (UE), comprising:
   a processor; and
   memory in electronic communication with the processor;
   wherein the processor and the memory are configured to:
   perform an extensible authentication protocol (EAP) procedure with an authentication server via an authenticator, the EAP procedure based at least in part on a set of authentication credentials exchanged between the UE and the authentication server;
   derive, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

determine a network type associated with the authenticator; and perform, based at least in part on the determined network type, at least one authentication procedure with the authenticator, the at least one authentication procedure based on an association of the MSK or the EMSK with the network type.

10. The apparatus of claim 9, wherein the determined network type comprises a cellular network type and performing the at least one authentication procedure with the authenticator comprises the processor and memory configured to:

derive a first security key for a cellular network, the first security key based at least in part on the EMSK and a second set of parameters.

11. The apparatus of claim 10, wherein the second set of parameters comprises:

an identifier of the cellular network, at least one cellular network-specific parameter, at least one parameter exchanged between the UE and the cellular network, or a combination thereof.

12. The apparatus of claim 10, wherein performing the at least one authentication procedure with the authenticator comprises the processor and memory configured to:

derive a second security key for a network node of the cellular network, the second security key based at least in part on the first security key and a third set of parameters; and communicate with the cellular network via the network node based at least in part on the second security key.

13. The apparatus of claim 12, wherein the third set of parameters comprises:

an identifier of the network node, at least one network node-specific parameter, at least one parameter exchanged between the UE and the network node, or a combination thereof.

14. The apparatus of claim 10, wherein the cellular network comprises at least one of:

a fifth generation (5G) network, a fourth generation (4G) network, a Long Term Evolution (LTE) network, a LTE-Advanced (LTE-A) network, a third generation (3G) network, or a combination thereof.

15. The apparatus of claim 9, wherein the determined network type is a non-cellular network type and performing the at least one authentication procedure with the authenticator comprises:

deriving a first security key for a non-cellular network, the first security key based at least in part on the MSK and a second set of parameters.

16. A non-transitory computer-readable medium storing computer-executable code for wireless communication at a user equipment (UE), the code executable by a processor to:

perform an extensible authentication protocol (EAP) procedure with an authentication server via an authenticator, the EAP procedure based at least in part on a set of authentication credentials exchanged between the UE and the authentication server;

derive, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

determine a network type associated with the authenticator; and perform, based at least in part on the determined network type, at least one authentication procedure with the authenticator, the at least one authentication procedure based on an association of the MSK or the EMSK with the determined network type.

17. A method for wireless communication at an authentication server, comprising:

performing an extensible authentication protocol (EAP) procedure with a user equipment (UE) via an authenticator, the EAP procedure based at least in part on a set of authentication credentials exchanged between the authentication server and the UE;

deriving, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

determining a network type associated with the authenticator;

deriving a security key for the determined network type based at least in part on an association of the MSK or the EMSK with the network type, and based at least in part on a second set of parameters; and transmitting the security key to the authenticator via a secure channel.

18. The method of claim 17, wherein the determined network type comprises a cellular network type and the second set of parameters comprises:

an identifier of a cellular network, at least one cellular network-specific parameter, at least one parameter exchanged between the authentication server and the cellular network, or a combination thereof.

19. The method of claim 18, wherein the cellular network comprises at least one of:

a fifth generation (5G) network, a fourth generation (4G) network, a Long Term Evolution (LTE) network, a LTE-Advanced (LTE-A) network, a third generation (3G) network, or a combination thereof.

20. An apparatus for wireless communication at an authentication server, comprising:

means for performing an extensible authentication protocol (EAP) procedure with a user equipment (UE) via an authenticator, the EAP procedure based at least in part on a set of authentication credentials exchanged between the authentication server and the UE;

means for deriving, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

means for determining a network type associated with the authenticator;

means for deriving a security key for the determined network type based at least in part on an association of the MSK or the EMSK with the determined network type, and based at least in part on a second set of parameters; and means for transmitting the security key to the authenticator via a secure channel.

21. An apparatus for wireless communication at an authentication server, comprising:

a processor; and memory in electronic communication with the processor; wherein the processor and the memory are configured to:

perform an extensible authentication protocol (EAP) procedure with a user equipment (UE) via an authenticator, the EAP procedure based at least in part on a set of authentication credentials exchanged between the authentication server and the UE;

derive, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

determine a network type associated with the authenticator;

derive a security key for the determined network type based at least in part on an association of the MSK or the EMSK with the determined network type, and based at least in part on a second set of parameters; and transmit the security key to the authenticator via a secure channel.

22. The apparatus of claim 21, wherein the determined network type comprises a cellular network type and the second set of parameters comprises:

an identifier of a cellular network, at least one cellular network-specific parameter, at least one parameter exchanged between the authentication server and the cellular network, or a combination thereof.

23. The apparatus of claim 22, wherein the cellular network comprises at least one of:

a fifth generation (5G) network, a fourth generation (4G) network, a Long Term Evolution (LTE) network, a LTE-Advanced (LTE-A) network, a third generation (3G) network, or a combination thereof.

24. A non-transitory computer-readable medium storing computer-executable code for wireless communication at an authentication server, the code executable by a processor to:

perform an extensible authentication protocol (EAP) procedure with a user equipment (UE) via an authenticator, the EAP procedure based at least in part on a set of authentication credentials exchanged between the authentication server and the UE;

derive, as part of performing the EAP procedure, a master session key (MSK) and an extended master session key (EMSK) that are based at least in part on the authentication credentials and a first set of parameters, wherein the first set of parameters comprises: at least one identifier, at least one random number, at least one network parameter, at least one UE parameter, or a combination thereof;

determine a network type associated with the authenticator;

derive a security key for the determined network type based at least in part on an association of the MSK or the EMSK with the determined network type, and based at least in part on a second set of parameters; and transmit the security key to the authenticator via a secure channel.

25. A method for wireless communication at a cellular network, comprising:

receiving, from an authentication server, a first security key based at least in part on an extended master session key (EMSK) and a first set of parameters, the EMSK based at least in part on a set of authentication credentials and a second set of parameters, the authentication credentials exchanged between a user equipment (UE) and the authentication server during an extensible authentication protocol (EAP) procedure wherein the second set of parameters comprises: at least one identifier, at least one random number, at least one network parameter, at least one UE parameter, or a combination thereof; and performing at least one authentication procedure with the UE based at least in part on the first security key.

26. The method of claim 25, wherein performing the at least one authentication procedure with the UE comprises:

deriving a second security key for a network node of the cellular network, the second security key based at least in part on the first security key and a third set of parameters; and communicating with the UE via the network node based at least in part on the second security key.

27. The method of claim 26, wherein the third set of parameters comprises:

an identifier of the network node, at least one network node-specific parameter, at least one parameter exchanged between the UE and the network node, or a combination thereof.

28. The method of claim 25, wherein the first set of parameters comprises:

an identifier of the cellular network, at least one cellular network-specific parameter, at least one parameter exchanged between the UE and the cellular network, or a combination thereof.

29. The method of claim 25, wherein the cellular network comprises at least one of:

a fifth generation (5G) network, a fourth generation (4G) network, a Long Term Evolution (LTE) network, a LTE-Advanced (LTE-A) network, a third generation (3G) network, or a combination thereof.

30. An apparatus for wireless communication at a cellular network, comprising:

means for receiving, from an authentication server, a first security key based at least in part on an extended master session key (EMSK) and a first set of parameters, the EMSK based at least in part on a set of authentication credentials and a second set of parameters, the authentication credentials exchanged between a user equipment (UE) and the authentication server during an extensible authentication protocol (EAP) procedure, wherein the second set of parameters comprises: at least one identifier, at least one random number, at least one network parameter, at least one UE parameter, or a combination thereof; and means for performing at least one authentication procedure with the UE based at least in part on the first security key.

31. An apparatus for wireless communication at a cellular network, comprising:

a processor; and memory in electronic communication with the processor; wherein the processor and the memory are configured to:

receive, from an authentication server, a first security key based at least in part on an extended master session key (EMSK) and a first set of parameters, the EMSK based at least in part on a set of authentication credentials and a second set of parameters, the authentication credentials exchanged between a user equipment (UE) and the authentication server during an extensible authentication protocol (EAP) procedure, wherein the second set of parameters comprises: at least one identifier, at least one random number, at least one network parameter, at least one UE parameter, or a combination thereof; and perform at least one authentication procedure with the UE based at least in part on the first security key.

32. The apparatus of claim 31, wherein performing the at least one authentication procedure with the UE comprises the processor and memory configured to:

derive a second security key for a network node of the cellular network, the second security key based at least in part on the first security key and a third set of parameters; and communicate with the UE via the network node based at least in part on the second security key.

33. The apparatus of claim 32, wherein the third set of parameters comprises:

an identifier of the network node, at least one network node-specific parameter, at least one parameter exchanged between the UE and the network node, or a combination thereof.

34. The apparatus of claim 31, wherein the first set of parameters comprises:

an identifier of the cellular network, at least one cellular network-specific parameter, at least one parameter exchanged between the UE and the cellular network, or a combination thereof.

35. The apparatus of claim 31, wherein the cellular network comprises at least one of:

a fifth generation (5G) network, a fourth generation (4G) network, a Long Term Evolution (LTE) network, a LTE-Advanced (LTE-A) network, a third generation (3G) network, or a combination thereof.

36. A non-transitory computer-readable medium storing computer-executable code for wireless communication at a cellular network, the code executable by a processor to:

receive, from an authentication server, a first security key based at least in part on an extended master session key (EMSK) and a first set of parameters, the EMSK based at least in part on a set of authentication credentials and a second set of parameters, the authentication credentials exchanged between a user equipment (UE) and the authentication server during an extensible authentication protocol (EAP) procedure, wherein the second set of parameters comprises: at least one identifier, at least one random number, at least one network parameter, at least one UE parameter, or a combination thereof; and perform at least one authentication procedure with the UE based at least in part on the first security key.

* * * * *